(12) United States Patent
Kondo et al.

(10) Patent No.: US 12,444,933 B2
(45) Date of Patent: Oct. 14, 2025

(54) SURGE SUPPRESSION DEVICE

(71) Applicant: Proterial, Ltd., Tokyo (JP)

(72) Inventors: Tsukasa Kondo, Tokyo (JP); Haruyasu Komano, Tokyo (JP)

(73) Assignee: Proterial, Ltd., Tokyo (JP)

( * ) Notice: Subject to any disclaimer, the term of this patent is extended or adjusted under 35 U.S.C. 154(b) by 297 days.

(21) Appl. No.: 18/172,203

(22) Filed: Feb. 21, 2023

(65) Prior Publication Data

US 2023/0268732 A1 Aug. 24, 2023

(30) Foreign Application Priority Data

Feb. 22, 2022 (JP) .................................. 2022-025901
Sep. 30, 2022 (JP) .................................. 2022-157380

(51) Int. Cl.
*H02H 9/00* (2006.01)
*H01R 9/24* (2006.01)
*H02H 7/16* (2006.01)
*H02H 9/04* (2006.01)

(52) U.S. Cl.
CPC ........... *H02H 9/045* (2013.01); *H01R 9/2441* (2013.01); *H02H 7/16* (2013.01); *H02H 9/044* (2013.01)

(58) Field of Classification Search
None
See application file for complete search history.

(56) References Cited

U.S. PATENT DOCUMENTS

| | | | | |
|---|---|---|---|---|
| 5,055,990 A | * | 10/1991 | Miki | H01L 25/165 |
| | | | | 363/56.05 |
| 5,734,140 A | * | 3/1998 | Hokuto | H02B 13/0356 |
| | | | | 218/143 |
| 6,087,800 A | * | 7/2000 | Becker | H05K 7/1432 |
| | | | | 318/370 |
| 2022/0045570 A1 | * | 2/2022 | Sagawa | H02H 9/041 |

FOREIGN PATENT DOCUMENTS

JP 2014-132811 A 7/2014

* cited by examiner

*Primary Examiner* — Stephen W Jackson
(74) *Attorney, Agent, or Firm* — Studebaker Brackett PLLC

(57) ABSTRACT

A surge suppression device has a resistive element, a capacitor electrically connected to the resistive element, a terminal electrically connected to the opposite side of the resistive element to the side connected to the capacitor, a fixing metal bracket to be fixed to a fixing target, and a mold resin to mold the resistive element, the terminal and the fixing metal bracket. The capacitor is located away from the mold resin.

19 Claims, 17 Drawing Sheets

SURGE SUPPRESSION DEVICE

CROSS-REFERENCE TO RELATED APPLICATIONS

The present patent application claims the priority of Japanese patent application No. 2022-025901 filed on Feb. 22, 2022, and the priority of Japanese patent application No. 2022-157380 filed on Sep. 30, 2022, and the entire contents thereof are hereby incorporated by reference.

TECHNICAL FIELD

The present invention relates to a surge suppression device.

BACKGROUND OF THE INVENTION

Patent Literature 1 discloses a surge suppression unit for suppressing the generation of surge voltage in the wiring of three-phase alternating current from an inverter to a motor. The surge suppression unit described in Patent Literature 1 has three series circuits each with a resistor and a capacitor, and the ends of the three series circuits on the capacitor side are connected to each other.

Citation List Patent Literature 1: JP2014-132811A

SUMMARY OF THE INVENTION

Here, in a series circuit in which a resistor and a capacitor are connected, unless special efforts are made, the capacitor may receive heat from the resistor, causing an excessive temperature rise, which may lead to a decrease in the life of the capacitor. However, in Patent Literature 1, there is no detailed description of the structure of a series circuit in which a resistor and a capacitor are connected.

The present invention was made in view of the aforementioned circumstances, and it is an object to provide a surge suppression device capable of suppressing a temperature rise of a capacitor.

So as to achieve the above-mentioned object, one aspect of the present invention provides a surge suppression device, comprising: a resistive element;
a capacitor electrically connected to the resistive element;
a terminal electrically connected to an opposite side of the resistive element to a side connected to the capacitor;
a fixing metal bracket to be fixed to a fixing target; and
a mold resin to mold the resistive element, the terminal, and the fixing metal bracket,
wherein the capacitor is located away from the mold resin.

Advantageous Effects of the Invention

According to the present invention, it is possible to provide the surge suppression device that can suppress the temperature rise of the capacitor.

DETAILED DESCRIPTION OF THE INVENTION

First Embodiment

The first embodiment of the present invention will be described with reference to FIGS. 1 to 5. The embodiments described below is shown as a suitable concrete example for implementing the invention, and although there are parts that specifically illustrate various technically preferred technical matters, the technical scope of the invention is not limited thereto concrete embodiment.

Figure 1:
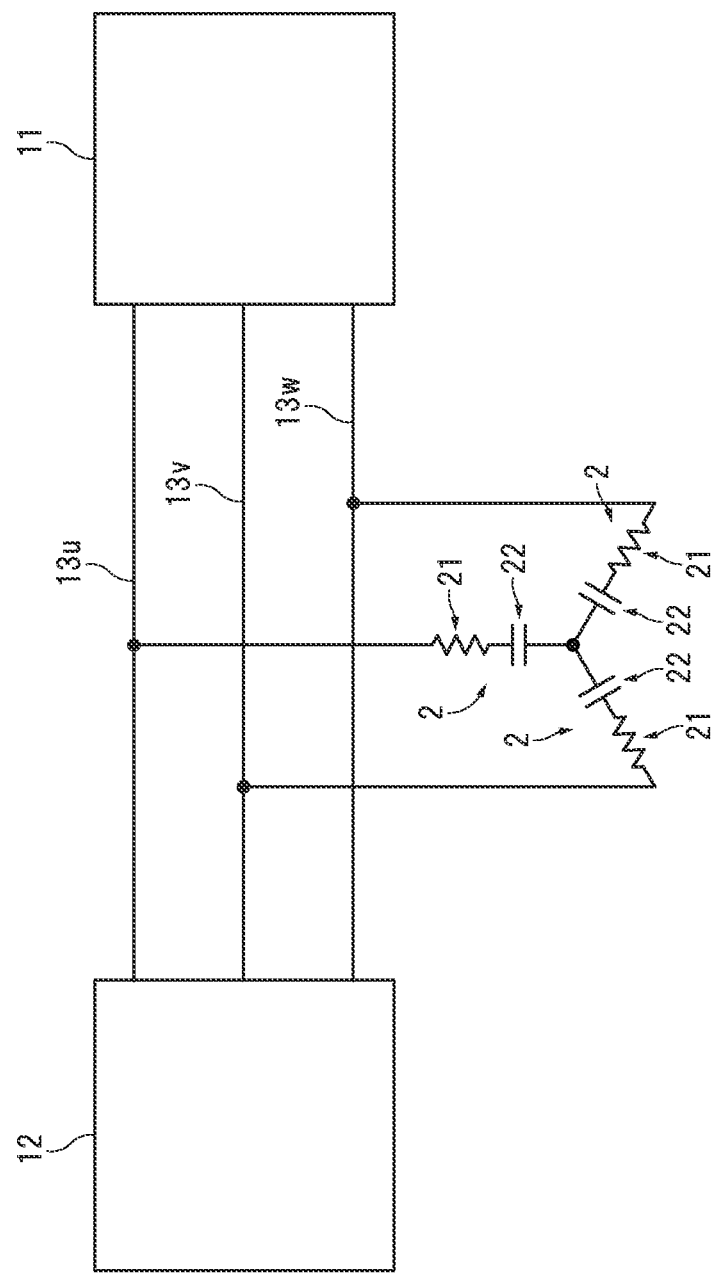
FIG. 1 shows a circuit diagram of a surge suppression device in use in the first embodiment.

FIG. 1 is a circuit diagram showing a surge suppression device 1 in use. The surge suppression device 1 of this embodiment is used, for example, by being connected to each of a U-phase wiring 13u, a V-phase wiring 13v, and a W-phase wiring 13w between a motor 11 and an inverter 12. In this case, the surge suppression device 1 suppresses the application of surge voltage to the motor 11. The surge suppression device 1 has three series circuits 2, in which a resistive element 21 and a capacitor 22 are connected in series. The three series circuits 2 are connected to the U-phase wiring 13u, V-phase wiring 13v, or W-phase wiring 13w, respectively, on a resistive element 21—side. The three series circuits 2 are star-connected by connecting the respective capacitor 22—sides to each other. The surge suppression device 1 of this embodiment will be described in detail hereinafter.

Figure 2:
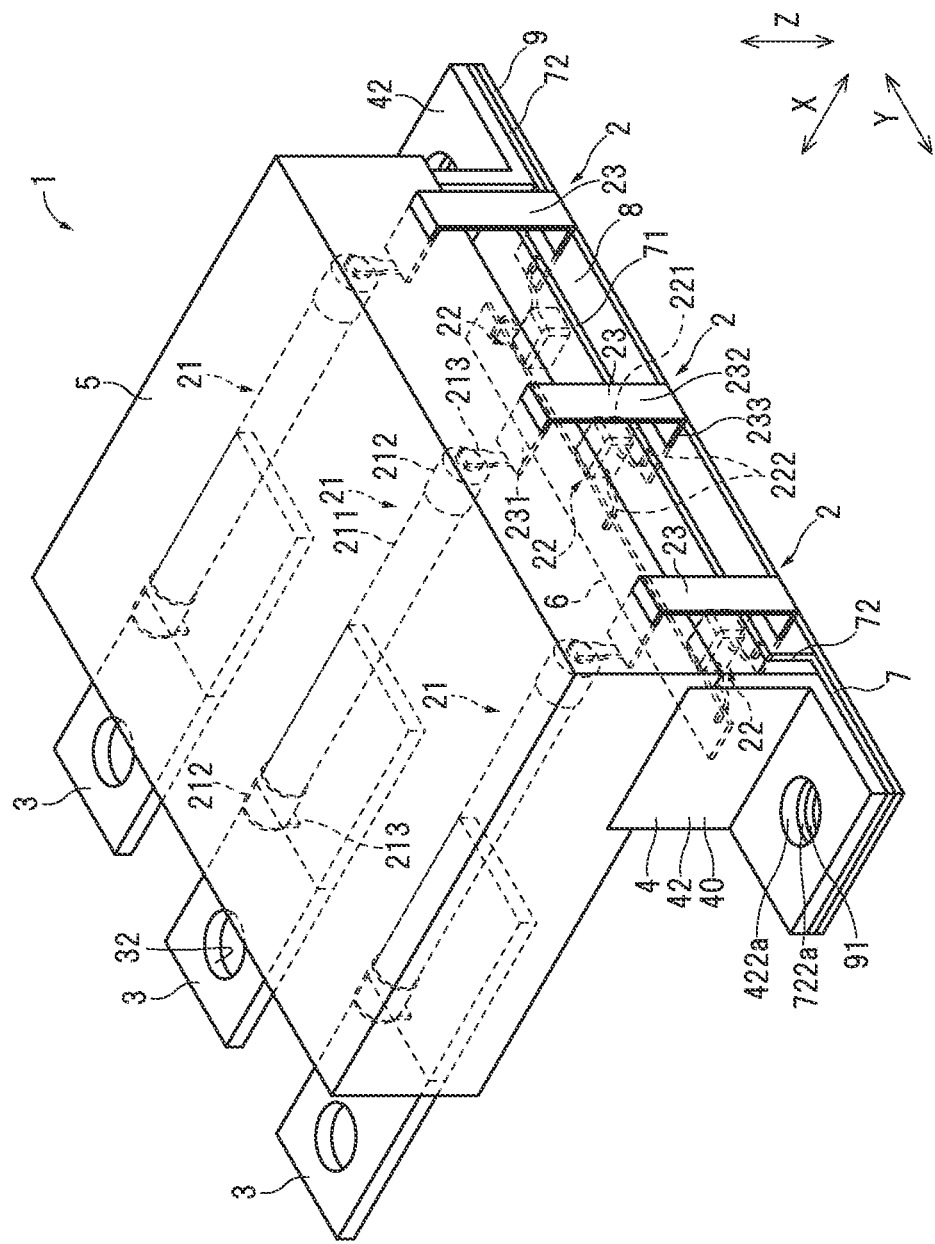
FIG. 2 is a perspective view of the surge suppression device in the first embodiment.
Figure 3:
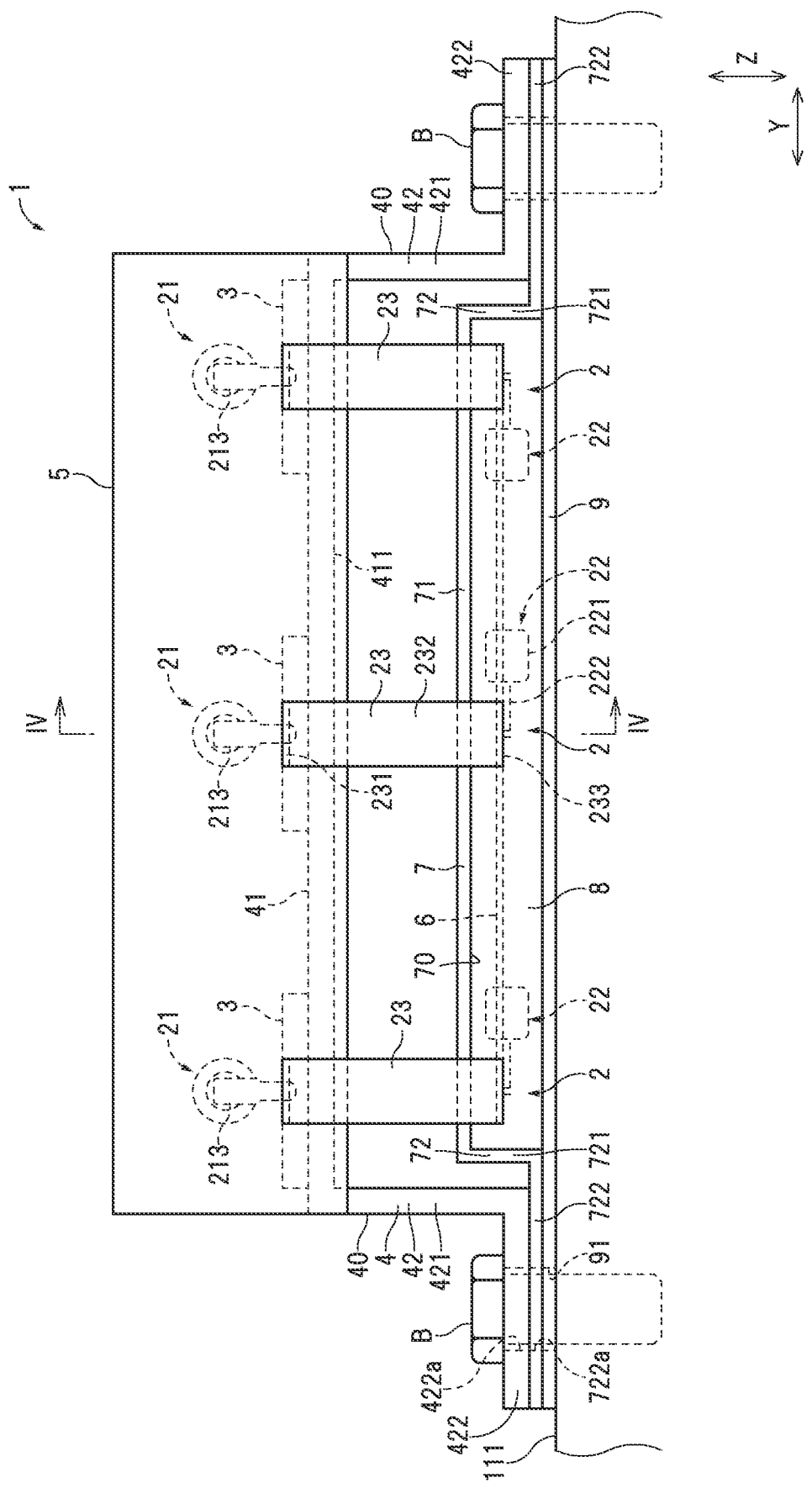
FIG. 3 is a front view of the surge suppression device in the first embodiment.
Figure 4:
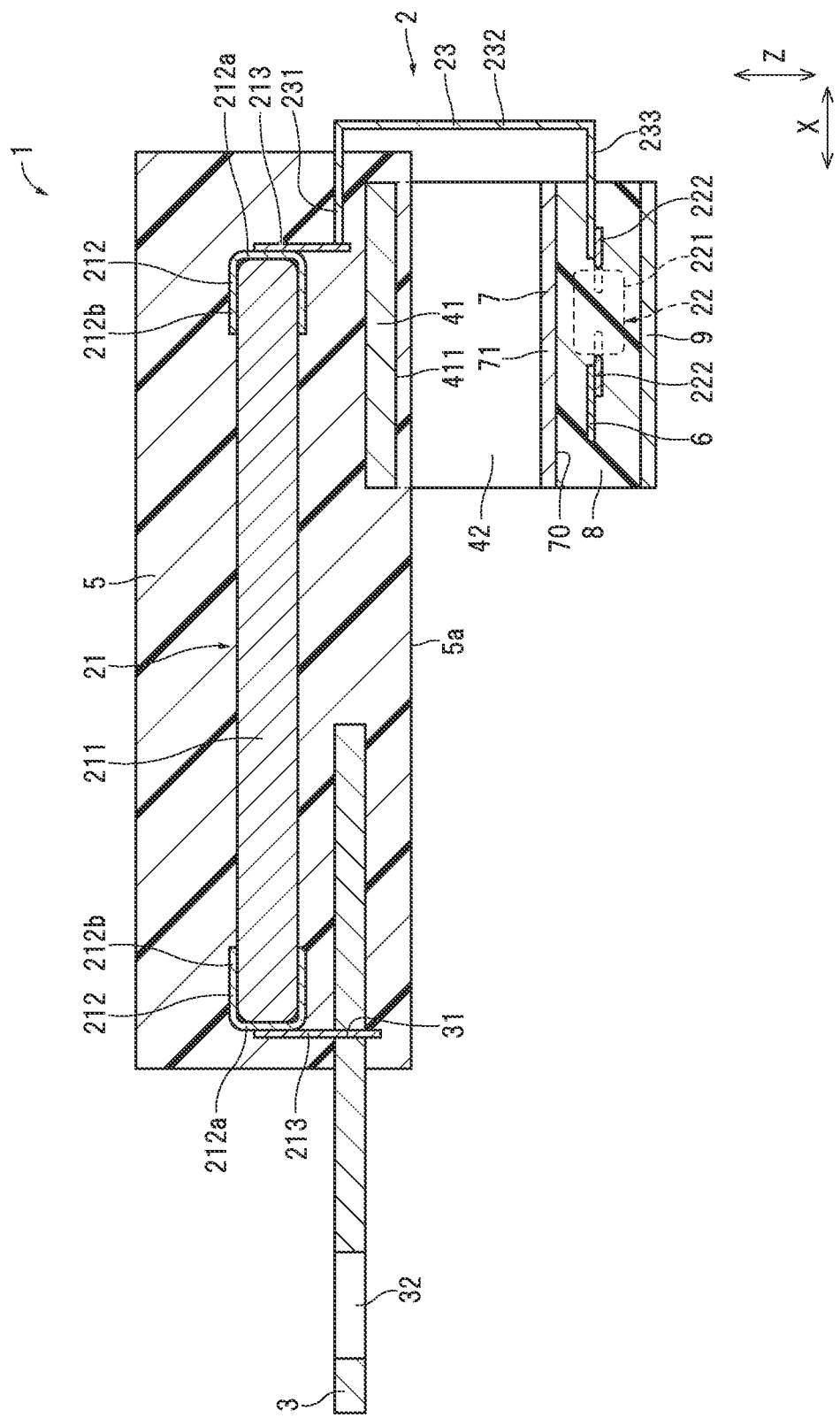
FIG. 4 is an arrowhead cross-sectional view along a IV-IV line in FIG. 3.

FIG. 2 is a perspective view of the surge suppression device 1. FIG. 3 is a front view of the surge suppression device 1. In addition to the surge suppression device 1, the motor case 111 and bolts b, which are to be fixed to the surge suppression device 1, are shown in FIG. 3. FIG. 4 is a IV-IV line arrowhead cross-portion of FIG. 3.

The surge suppression device 1 has three series circuits 2, three terminals 3, a fixing metal bracket 4, a mold resin 5, an interconnecting portion 6, a second fixing metal bracket 7, a second mold resin 8, and a flat plate portion 9. The series circuit 2 is composed of a resistive element 21 and a capacitor 22 connected in series via a connecting portion 23. The three terminals 3 are connected to the opposite side of the connecting portion 23 in the three resistive elements 21 respectively. As shown in FIG. 3, the fixing metal bracket 4 is fitted, for example, to the motor case 111 as a fixing target. The mold resin 5 molds the three resistive elements 21, the three terminals 3, and the fixing metal bracket 4. The interconnecting portions 6 electrically connect the opposite sides of the connecting portions 23 in the three capacitors 22. The second fixing metal bracket 7 is fitted to a fixation object, such as, for example, the motor case 111. The second mold resin 8 molds the three capacitors 22, the interconnecting portions 6, the connecting portions 23, and the second fixing metal bracket 7. The second mold resin 8 is an example of capacitor embedded resin in which the capacitors 22 are embedded. The flat plate portion 9 is provided to overlap the second fixing metal bracket 7.

The resistive elements 21 are formed lengthy in one direction; the three resistive elements 21 are arranged in parallel with each other. Hereafter, the longitudinal direction of the resistive element 21 is referred to as the X-direction. The direction at right angles to the X-direction in which the three resistive elements 21 are aligned is referred to as the Y-direction. Furthermore, the direction at right angles to both the X and Y-directions is referred to as the Z-direction.

The resistive element 21 includes a long resistive element 211 in the X-direction and two cap electrodes 212 fitted to both ends of the resistive element 211. The resistive element 211 can be, for example, a wire wound resistive element or a ceramic resistive element, although there is no particular limitation. The cap electrodes 212 are made of conductive metal in the form of caps. As shown in FIG. 4, the cap electrode 212 has a disc-shaped bottom portion 212a facing the resistive element 211 in the X-direction and a circular cylindrical side portion 212b extending from the periphery edge of the bottom portion 212a to a resistive element 211—side in the X-direction. The resistive element 21 has two resistive element terminals 213 connected to each cap electrode 212. The resistive element terminals 213 are formed as plates opposite the bottom portion 212a and are joined to the bottom portion 212a. The two resistive element terminals 213 of the resistive elements 21 are formed to protrude from the joined cap electrode 212 to the same side of each other. The one-sided resistive terminal 213 of each of the three resistive elements 21 is connected to the terminal 3, and the other resistive terminal 213 of each is connected to the connecting portion 23. Hereinafter, the side with the two resistive element terminals 213 protruding in the resistive element 21 may be referred to as the lower side and the opposite side as the upper side, but the expressions upper and lower are for convenience and do not limit the orientation of the surge suppression device 1 with respect to the vertical direction in the state of use, for example.

The terminal 3 has a thickness in the Z-direction and a plate shape that is long in the X-direction. The terminal 3 is made of metal, such as pure copper, for example. As shown in FIG. 4, the terminal 3 has a through hole 31 into which the resistive element terminal 213 is inserted. The resistive element terminal 213 may not only be inserted into the through hole 31, but may also be joined to the terminal 3 using solder or the like. One end of one side in the X-direction in the terminal 3 faces the resistive element 21 in the Z-direction through the mold resin 5. Specifically, the terminal 3 faces the cap electrode 212 on the terminal 3 side in the resistive element 21 and the portion between the two cap electrodes 212 in the resistive element 211 in the Z-direction through the mold resin 5. A bolt insertion hole 32 is formed at the end opposite to the resistive element 21 in the terminal 3. The end of the terminal 3 is electrically connected to the U-phase wiring (see reference character 13u in FIG. 1), V-phase wiring (see reference character 13v in FIG. 1), or W-phase wiring (see reference character 13w in FIG. 1).

The connecting portion 23 has the shape of a long plate-shaped metal material bent into a U-shape. In this embodiment, the connecting portion 23 is made of a metallic material having lower thermal conductivity than the terminal 3. Specifically, the connecting portion 23 is made of phosphor bronze, which has a lower thermal conductivity than pure copper, the metal material constituting the terminal 3. This increases the thermal resistance in the thermal path from the resistive element 21 to the capacitor 22 through the connecting portion 23 and reduces the heat transferred to the capacitor 22. The connecting portion 23 has a first portion 231, a second portion 232, and a third portion 233. The first portion 231 is connected to the resistive element terminal 213 on the opposite side of the terminal 3 in the resistive element 21 and extends in the X-direction. The first portion 231 is connected to the resistive element terminal 213 by solder or the like at the end in the X-direction. The second portion 232 extends downward from the end of the first portion 231 opposite the resistive element terminal 213. The third portion 233 is extended in the X-direction from the lower end of the second portion 232 and is connected to the capacitor 22. The cross-sectional area of the connecting portion 23 is smaller than the area of the cross-sectional area perpendicular to the X-direction of the terminal 3. The cross-sectional area of the connecting portion 23 is the area of the cross-portion perpendicular to the heat path from the resistive element 21 through the connecting portion 23 to the capacitor 22. In other words, the heat of the resistive element 21 is transferred to the capacitor 22 by traveling in the X-direction through the first portion 231, in the Z-direction through the second portion 232, and in the X-direction through the third portion 233, and the cross-sectional area of the connecting portion 23 means the area of the cross portion perpendicular to the X-direction of the first portion 231, the area of the cross portion perpendicular to the Z-direction of the second portion 232, or the area of the cross portion perpendicular to the X-direction of the third portion 233. The width of the connecting portion 23 is smaller than the width of the terminal 3. The width of the connecting portion 23 may be smaller than the diameter of the cap electrode 212 of the resistive element 21. Furthermore, the thickness of the connecting portion 23 is smaller than the thickness of the terminal 3. These allow the thermal resistance at the connecting portion 23 to be greater than the thermal resistance of the terminal 3, reducing the heat transferred from the resistive element 21 to the capacitor 22 through the connecting portion 23.

As shown in FIG. 3, the fixing metal bracket 4 is made of a crank-shaped metal having thermal conductivity, such as aluminum. The fixing metal bracket 4 has a base 41 extending in the Y-direction and two extending portions 42 extending downward from both ends of the base 41 in the Y-direction. As shown in FIGS. 3 and 4, the base 41 faces the three resistive elements 21 and the three connecting portions 23 in the Z-direction via the mold resin 5. Specifically, the base 41 faces in the Z-direction via the mold resin 5 to the part between the two cap electrodes 212 in the resistive elements 21, the cap electrode 212 on the connecting portion 23 side, and the first portion 231 in the connecting portion 23.

As shown in FIG. 3, the extending portion 42 has a vertical extending portion 421 extending downward from both ends of the base 41 and a transverse extending portion 422 extending outward in the Y-direction from the lower end of the vertical extending portion 421. The transverse extending portion 422 has a bolt insertion hole 422a that penetrates in the Z-direction. In the bolt insertion hole 422a, a bolt b is inserted to fix the fixing metal bracket 4 to the motor case 111 as a fixing target. Then, the three resistive elements 21, the three terminals 3, the three connecting portions 23, and the fixing metal bracket 4 are molded with the mold resin 5.

As shown in FIG. 2, the mold resin 5 has a rectangular shape with thickness in the Z-direction. The mold resin 5 is formed by placing the three terminals 3, the three resistive elements 21, the three connecting portions 23, and the fixing metal bracket 4 in the mold and injecting resin into the mold to cure it. The mold resin 5 molds the entire three resistive elements 21. The mold resin 5 also covers a portion of each of the terminal 3, the connecting portion 23, and the fixing metal bracket 4. The terminal 3 is exposed from the mold resin 5 on the side of the bolt insertion hole 32, and the part opposite to the bolt insertion hole 32 is covered by the mold resin 5. The connecting portion 23 is covered with the mold resin 5 except for the end of the second portion 232—side in the first portion 231. In the fixing metal bracket 4, the upper ends of the base 41 and each of the two extending portions 42 are covered by the mold resin 5.

As shown in FIG. 3, the length of the base 41 in the Y-direction is approximately the same as the length of the mold resin 5 in the Y-direction. And, as shown in FIG. 2, the main surface 40 of the fixing metal bracket 4 when viewed from the Y-direction is exposed from the mold resin 5 and is flush with the surface of the mold resin 5. As shown in FIGS. 3 and 4, the bottom surface 411 of the base 41 is located above the bottom surface 5a of the mold resin 5 and is covered by the mold resin 5.

Figure 5:
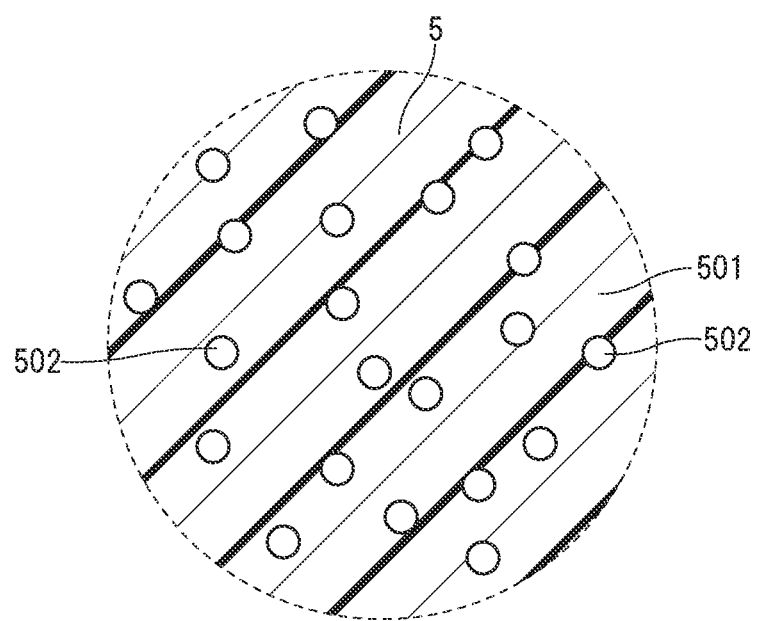
FIG. 5 is an enlarged cross-sectional view of a mold resin in the first embodiment.

FIG. 5 shows an enlarged schematic diagram of a portion of the cross portion of the mold resin 5. The mold resin 5 is composed of a base resin 501 having electrical insulation properties and a filler 502 having a higher thermal conductivity than the base resin 501. The base resin 501 is made of an electrically insulating resin, such as PPS (polyphenylene sulfide) resin or epoxy resin. The filler 502 can be composed of, for example, metal or ceramic powder, specifically aluminum oxide, boron nitride, aluminum nitride, or the like. In FIG. 5, the filler 502 is represented as a circular shape for convenience, but the shape of the filler 502 is not limited thereto. The thermal conductivity of mold resin 5 should be 3 W/(m·K) or more. The thermal conductivity of mold resin 5 can also be 10 W/(m·K) or less. As shown in FIGS. 2 to 4, three capacitors 22 are placed on the underside of the mold resin 5.

The capacitors 22 can be ceramic capacitors, for example, having a capacitor body 221 in which a capacitor element is coated with resin, and two capacitor terminals 222 protruding from the capacitor body 221. One of the capacitor terminals 222 is connected to the third portion 233 of the connecting portion 23. The ends opposite to the connecting portion 23 in the three capacitors 22 are connected to each other at the interconnecting portion 6. The interconnecting portion 6 is a bus bar that is long in the Y-direction and thick in the Z-direction.

As shown in FIG. 3, the second fixing metal bracket 7 is made of a crank-shaped metal having thermal conductivity, such as aluminum. The second fixing metal bracket 7 has a second base 71 extending in the Y-direction and two second extending portions 72 extending downward from both ends of the second base 71 in the Y-direction. The second extending portion 72 has a second longitudinal extending portion 721 extending from the second base 71 in the Z-direction and a second transverse extending portion 722 extending from the lower ends of the second longitudinal extending portion 721 to the outside in the Y-direction. The three capacitors 22 and the interconnecting portions 6 are arranged in the recess 70 formed by the second base 71 and the second longitudinal extending portion 721. The second transverse extending portion 722 is located below the transverse extending portion 422 of the fixing metal bracket 4 and overlaps said transverse extending portion 422 in the Z-direction. The second transverse extending portion 722 has a bolt insertion hole 722a that is connected to the bolt insertion hole 422a of the transverse extending portion 422. As shown in FIG. 4, the width of the second fixing metal bracket 7 in the X-direction is equal to the width of the fixing metal bracket 4 in the X-direction, and in the X-direction, the second fixing metal bracket 7 is formed in the same area as the fixing metal bracket 4. The three capacitors 22, the interconnecting portion 6, and the second fixing metal bracket 7 are molded with the second mold resin 8.

The second mold resin 8 is formed to fill the recess 70 of the second fixing metal bracket 7. The second mold resin 8 is formed by placing the three capacitors 22, the interconnecting portions 6, the connecting portions 23, and the second fixing metal bracket 7 in the mold and injecting resin into the mold to cure. The second mold resin 8 covers the entirety of the three capacitors 22 and the interconnecting portions 6, and covers the third portion 233 of the connecting portion 23. The second mold resin 8 also covers the inner surface of the recess 70 in the second fixing metal bracket 7.

The second mold resin 8 is formed at a distance from the mold resin 5. Then, a space exists between the mold resin 5 and the second mold resin 8. When viewed from the Z-direction, the entire second mold resin 8 fits into the formed area of the mold resin 5. The second mold resin 8 is located between the two extending portions 42 of the fixing metal bracket 4.

In this embodiment, the second mold resin 8 is made of the same material as the mold resin 5. That is, the second mold resin 8 comprises a base resin having electrical insulation properties and a filler having a higher thermal conductivity than the base resin. The thermal conductivity of the second mold resin 8 should be 3 W/(m·K) or more. The thermal conductivity of the mold resin 5 can be 10 W/(m·K) or less. A flat plate portion 9 is arranged on the underside of the second mold resin 8.

The flat plate portion 9 is formed as a plate having a thickness in the Z-direction and a length in the Y-direction. The flat plate portion 9 is made of a thermally conductive metal such as aluminum. The flat plate portion 9 is superimposed on the bottom surface of the transverse extending portion 422 and the bottom surface of the second mold resin 8 in the second fixing metal bracket 7. The flat plate portion 9 is not molded into the second mold resin 8. As shown in FIG. 3, the flat plate portion 9 has bolt insertion holes 91 that are connected to the bolt insertion holes 422a of the fixing metal bracket 4 and the bolt insertion holes 722a of the second fixing metal bracket 7. The fixing metal bracket 4, the second fixing metal bracket 7, and the flat plate portion 9 are co-tightened to the motor case 111 by inserting the bolts b through the bolt insertion holes 422a, bolt insertion holes 722a, and bolt insertion holes 91 and by screwing them to the motor case 111. The flat plate portion 9 allows more portions of the surface of the second mold resin 8 to be covered by metal members (i.e., the second fixing metal bracket 7 and the flat plate portion 9), which facilitates heat dissipation from the second mold resin 8 to the metal members. The flat plate portion 9 can be omitted.

Functions and Effects of the First Embodiment

The surge suppression device 1 of this embodiment is equipped with the mold resin 5 that molds the resistive element 21, the terminal 3, and the fixing metal bracket 4. Therefore, the heat generated in the resistive element 21 is transferred to the terminal 3 and fixing metal bracket 4 via the mold resin 5, and is dissipated to the mating member connected to the terminal 3 and the object to which the fixing metal bracket 44 is fixed. This prevents the heat generated in the resistive element 21 from being transferred to the capacitor 22 and causing the capacitor 22 to become hot. Since the capacitor 22 is located at a distance from the mold resin 5, the heat transfer from the mold resin 5 to the capacitor 22 is suppressed and the capacitor 22 temperature rise is suppressed. As a result, the capacitor 22 can be prolonged in life as a result of the suppression of the capacitor 22 temperature rise.

The fixing metal bracket 4 faces the resistive element 21 via the mold resin 5. Therefore, the heat transfer from the resistive element 21 to the fixing metal bracket 4 through the mold resin 5 can be promoted, and the heat dissipation of the resistive element 21 can be improved. As a result, the heat transfer from the resistive element 21 to the capacitor 22 is suppressed.

The terminal 3 faces the resistive element 21 through the mold resin 5. Therefore, the heat transfer from the resistive element 21 to the terminal 3 through the mold resin 5 can be promoted, and as a result, the heat transfer of the resistive element 21 to the capacitor 22 is suppressed.

The connecting portion 23 is molded by the mold resin 5, and the connecting portion 23 faces the fixing metal bracket 4 through the mold resin 5. Hence, the heat of the connecting portion 23 is easily transferred to the fixing metal bracket 4 via the mold resin 5, and the connecting portion 23 can be prevented from becoming hotter. As a result, the temperature rise of the capacitor 22 connected to the connecting portion 23 is suppressed.

The cross-sectional area of the connecting portion 23 is smaller than the cross-sectional area of the terminal 3. In other words, the thermal resistance of the connecting portion 23 is greater than that of the terminal 3. Therefore, heat generated in the resistive element 21 is more easily transferred to the terminal 3 than to the connecting portion 23, and the heat transfer to the connecting portion 23 connected to the capacitor 22 is suppressed. Furthermore, the connecting portion 23 is made of a metallic material with lower thermal conductivity than the terminal 3. Specifically, the connecting portion 23 is made of phosphor bronze, which has a lower thermal conductivity than pure copper, the metal material comprising the terminal 3. Therefore, the thermal resistance in the thermal path from the resistive element 21 to the capacitor 22 through the connecting portion 23 can be increased. As a result, less heat is transferred from the resistive element 21 to the capacitor 22 through the connecting portion 23, and more heat is dissipated directly from the resistive element 21 to the terminal 3 and from the resistive element 21 to the terminal 3 and the fixing metal bracket 4 through the mold resin 5. As a result, the high temperature of the capacitor 22 is further suppressed.

The surge suppression device 1 is also equipped with the second mold resin 8 that molds the connecting portion 23, the capacitor 22, and the second fixing metal bracket 7. Therefore, some of the heat emitted from the resistive element 21 goes through the connecting portion 23 to the capacitor 22, but the heat in the connecting portion 23 is diffused into the second mold resin 8 before reaching the capacitor 22. Hence, the heat transferred from the resistive element 21 to the capacitor 22 through the connecting portion 23 can be reduced. The heat generated in the capacitor 22 due to energizing the capacitor 22, etc. is diffused into the second mold resin 8. The heat diffused into the second mold resin 8 is then dissipated through the second fixing metal bracket 7 to the object to which the second fixing metal bracket 7 is fixed. Furthermore, the second mold resin 8 is located away from the mold resin 5. Hence, the heat from the mold resin 5 covering the resistive element 21 can be suppressed from being transferred to the second mold resin 8, and as a result, the temperature rise of the capacitor 22 in the second mold resin 8 is suppressed.

The base 41 of the fixing metal bracket 4 is molded by the mold resin 5, and the second mold resin 8 is arranged between the two extending portions 42. Hence, the space between the two extending portions 42 can be effectively utilized and the surge suppression device 1 as a whole can be downsized.

The mold resin 5 also molds the plurality of resistive elements 21. Therefore, the heat of the plurality of resistive elements 21 can be transferred to the fixing metal bracket 4 and the terminal 3 via one mold resin 5, and the surge suppression device 1 as a whole can be downsized and the number of parts can be reduced.

The mold resin 5 has the base resin 501, and the filler 502 that has a higher thermal conductivity than the base resin 501. Therefore, the thermal conductivity of the mold resin 5 can be made higher, increasing the heat transferred from the resistive element 21 through the mold resin 5 to the terminal 3 and the fixing metal bracket 4, thereby reducing the heat transferred from the resistive element 21 to the capacitor 22.

The thermal conductivity of the mold resin 5 is 3 W/(m·K) or more and 10 W/(m·K) or less. By setting the thermal conductivity of the mold resin 5 to 3 W/(m·K) or more, the heat transferred from the resistive element 21 through the mold resin 5 to the terminal 3 and fixing metal bracket 4 can be increased and the heat transferred from the resistive element 21 to the capacitor 22 can be reduced. In addition, by setting the thermal conductivity of the mold resin 5 to 10 W/(m·K) or less, the cost of the mold resin 5 can be reduced and its moldability can be improved. To increase the thermal conductivity of the mold resin 5, it is necessary to include more filler 502. However, the more filler 502 is added, the higher the cost of the mold resin 5 becomes, and the flowability of the raw material in a molten state, which becomes the mold resin 5, becomes poor, and the moldability of the mold resin 5 tends to deteriorate. Therefore, by setting the thermal conductivity of the mold resin 5 to 10 W/(m·K) or less, the cost of the mold resin 5 can be reduced and the moldability of the mold resin 5 can be improved.

As described above, according to the present embodiment, it is possible to provide the surge suppression device that can suppress the temperature rise of the capacitor.

Second Embodiment

Figure 6:
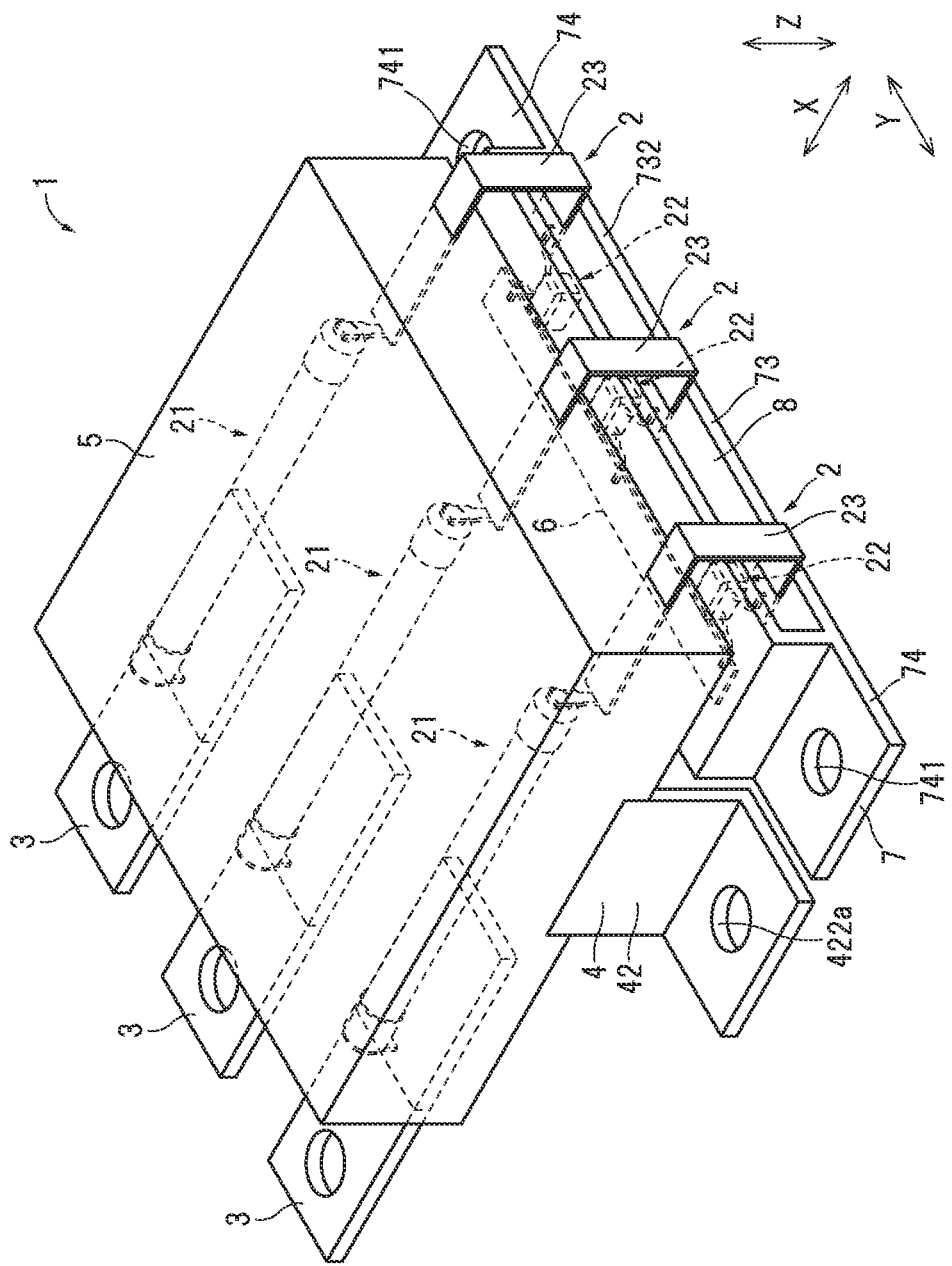
FIG. 6 is a perspective view of a surge suppression device in the second embodiment.
Figure 7:
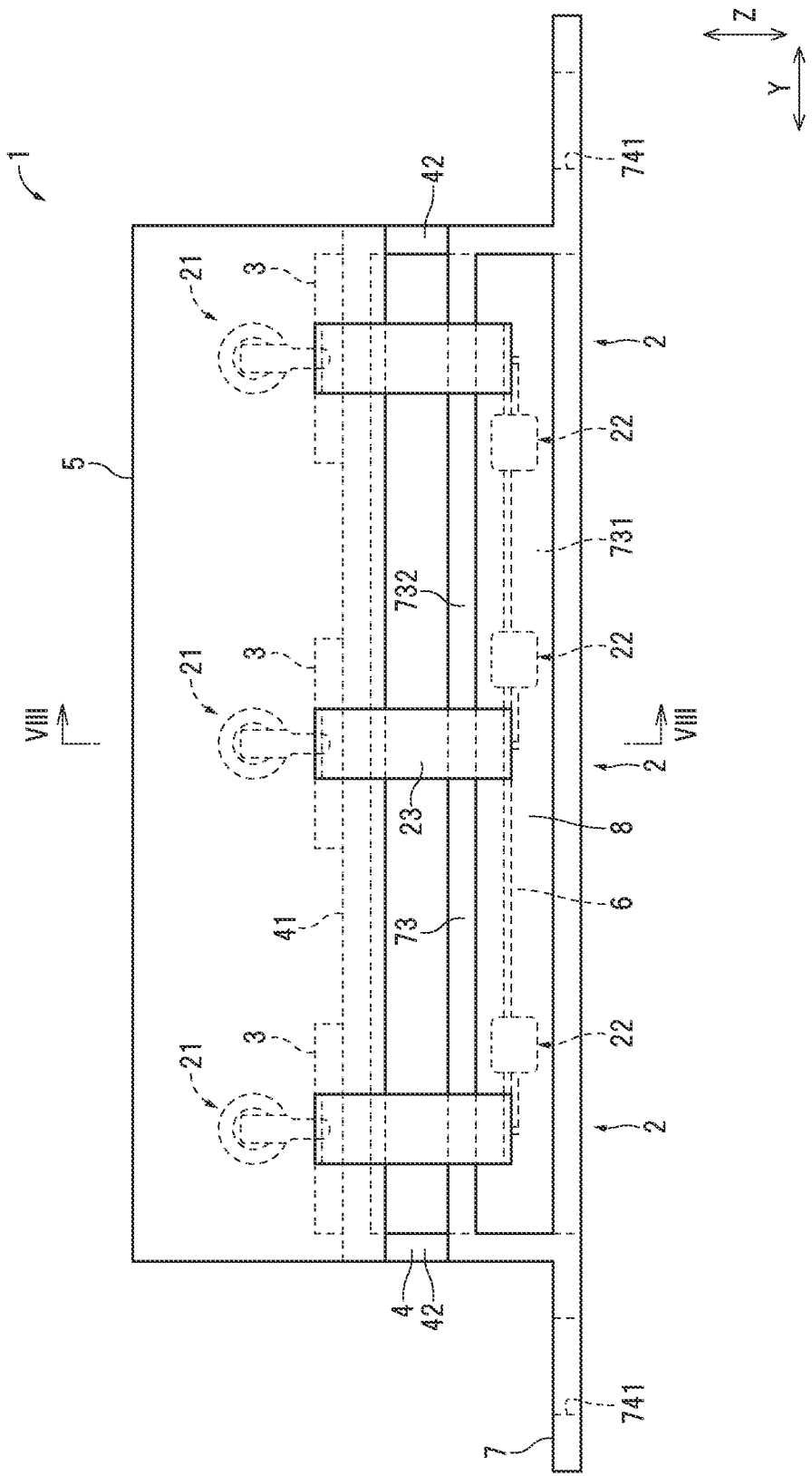
FIG. 7 is a front view of the surge suppression device in the second embodiment.
Figure 8:
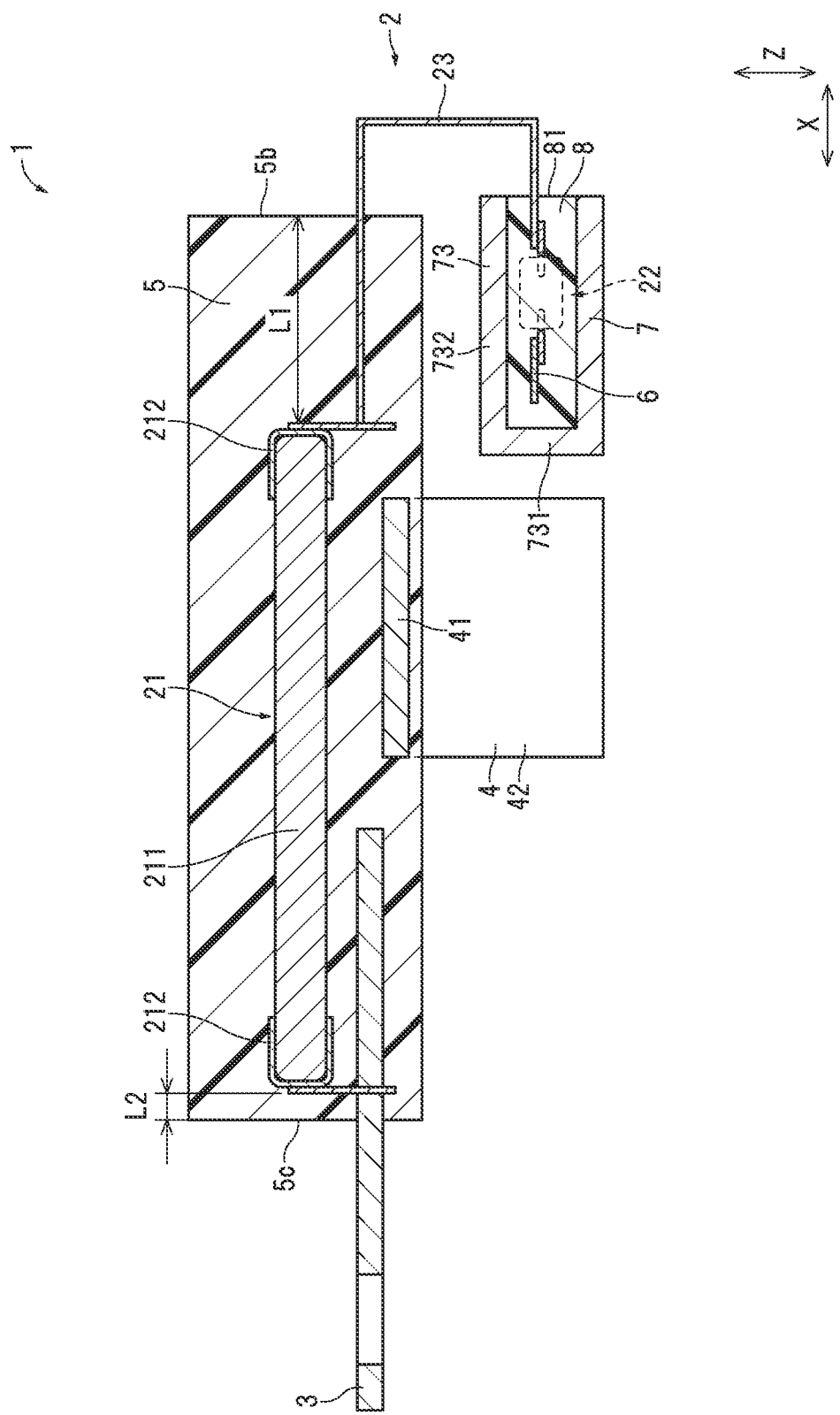
FIG. 8 is a VII-VII line arrowhead cross-sectional view of FIG. 6.

FIG. 6 is a perspective view of the surge suppression device 1 in this embodiment. FIG. 7 is a front view of the surge suppression device 1. FIG. 8 is the VII-VII arrowhead cross-portion of FIG. 7.

This embodiment is an embodiment in which the position of the fixing metal bracket 4 and the shape of the second fixing metal bracket 7, etc., are modified from the first embodiment.

As shown in FIG. 8, the base 41 of the bracket 4 faces in the Z-direction through the mold resin 5 to the portion between the two cap electrodes 212 in the resistive element 211, while it does not face the two cap electrodes 212 in the Z-direction. The base 41 partly faces the central region of the resistive element 21 in the X-direction in the Z-direction. Here, the central region of the resistive element 21 in the X-direction can be, for example, the central portion when the resistive element 21 is divided into five equal parts in the X-direction.

The three capacitors 22, the interconnecting portions 6, and the second fixing metal bracket 7, which are molded by the second mold resin 8, are arranged on opposite sides of the terminals 3 across the fixing metal bracket 4 in the X-direction. The three capacitors 22, the interconnecting portions 6, and the second fixing metal bracket 7 molded by the second mold resin 8 are located away from the fixing metal bracket 4.

The second fixing metal bracket 7 has a box-shaped portion 73 opening toward the opposite side of the terminal 3 in the X-direction and a flange portion 74 extending outward from the bottom end of the box-shaped portion 73 to both sides in the Y-direction. The box-shaped portion 73 has a rectangular plate-like bottom plate 731, which is thick in the X-direction and long in the Y-direction, and a rectangular cylindrical side plate 732, which is extended in the X-direction from the periphery of the bottom plate 731 and is open on the side opposite the bottom plate 731. Bolt insertion holes 741 are formed in the flange portion 74, and the second fixing metal bracket 7 is bolted to the motor case at the flange portion 74. In this embodiment, the fixing target of the second fixing metal bracket 7 is the motor case similar to the fixing target of the fixing metal bracket 4, but it may be a different member from the fixing target of the fixing metal bracket 4. The three capacitors 22 and the interconnecting portions 6 are received inside the box-shaped portion 73 of the second fixing metal bracket 7, and the second mold resin 8 is filled. The inside of the box-shaped portion 73 may be filled with resin by potting instead of the second mold resin 8. In this case, the load on the joints between the three capacitors 22 and the interconnecting portion 6 and the connecting portion 23 is easily reduced.

As shown in FIG. 8, the end face 5b of the side from which the connecting portion 23 protrudes in the mold resin 5 is located near the end face 81 of the side from which the connecting portion 23 protrudes in the second mold resin 8. The length L1 in the X-direction from the end face 5b of the mold resin 5 to the resistive element 21 is three times longer than the length L2 in the X-direction from the end face 5c on the side where the terminal 3 protrudes in the mold resin 5 to the resistive element 21. The length in the X-direction (i.e., L1) of the portion distributed in the mold resin 5 in the connecting portion 23 is three or more times longer than the length in the X-direction L2 from the end face 5c of the mold resin 5 to the resistive element 21. In this embodiment, the flat plate portion (see reference character 9 in FIGS. 2 to 4) is not arranged on the lower side of the second fixing metal bracket 7.

The other configuration of this embodiment is the same as that of the first embodiment. The same reference characters used in the second and subsequent embodiments as those used in the previous embodiments represent the same components, etc. as those in the previous embodiments, unless otherwise indicated.

Functions and Effects of the Second Embodiment

In this embodiment, the fixing metal bracket 4 has the base 41 facing the central region of the resistive element 21 in the Z-direction through the mold resin 5. Heat of the resistive element 21 tends to be dissipated to the terminal 3 and the connecting portion 23, which are metal parts in contact with the resistive element 21, and thus tends to stay in the center region of the resistive element 21 rather than both ends of the resistive element 21. Therefore, the heat in the center of the resistive element 21 can be dissipated to the fixing metal bracket 4 through the mold resin 5 by facing the fixing metal bracket 4 to the center of the resistive element 21. As a result, the temperature rise of the resistive element 21 can be suppressed and the heat transferred from the resistive element 21 to the capacitor 22 can be reduced.

The second mold resin 8 is filled inside the box-shaped portion 73 of the second fixing metal bracket 7. This allows a larger area of the second mold resin 8 to be enclosed by the second fixing metal bracket 7. As a result, the heat from the capacitor 22 is more easily dissipated through the second mold resin 8 to the second fixing metal bracket 7.

The length L1 in the X-direction of the portion distributed in the mold resin 5 in the connecting portion 23 is three times longer than the length L2 in the X-direction from the end face of the side from which the terminal 3 protrudes to the resistive element 21 in the mold resin 5. As a result, the heat transferred from the resistive element 21 to the connecting portion 23 is easily diffused into the mold resin 5, and the temperature rise of the connecting portion 23 is suppressed. Therefore, the heat transfer from the connecting portion 23 to the capacitor 22 is suppressed. Other functions and effects are the same as those of the first embodiment.

Third Embodiment

Figure 9:
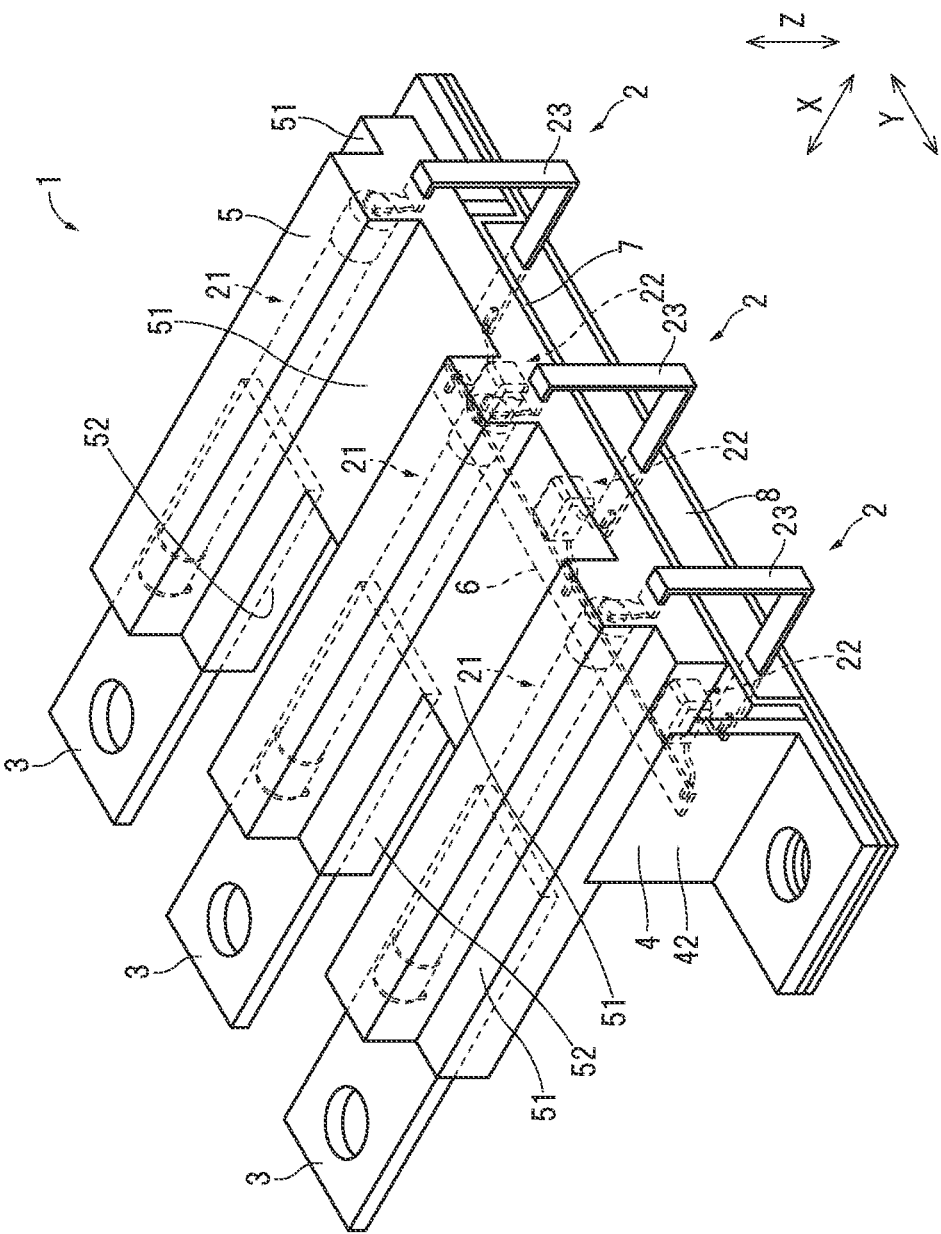
FIG. 9 is a perspective view of a surge suppression device in the third embodiment.
Figure 10:
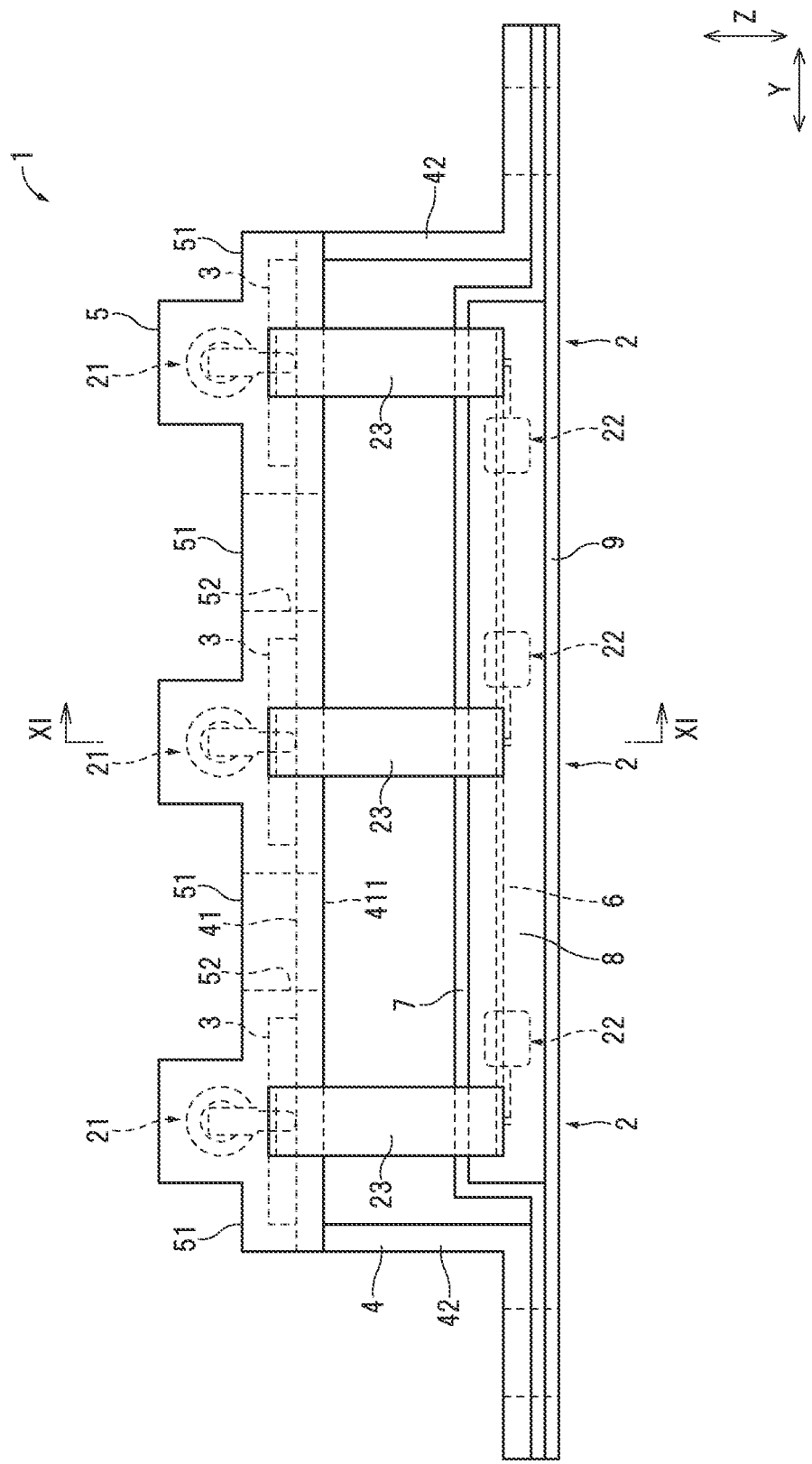
FIG. 10 is a front view of the surge suppression device in the third embodiment.
Figure 11:
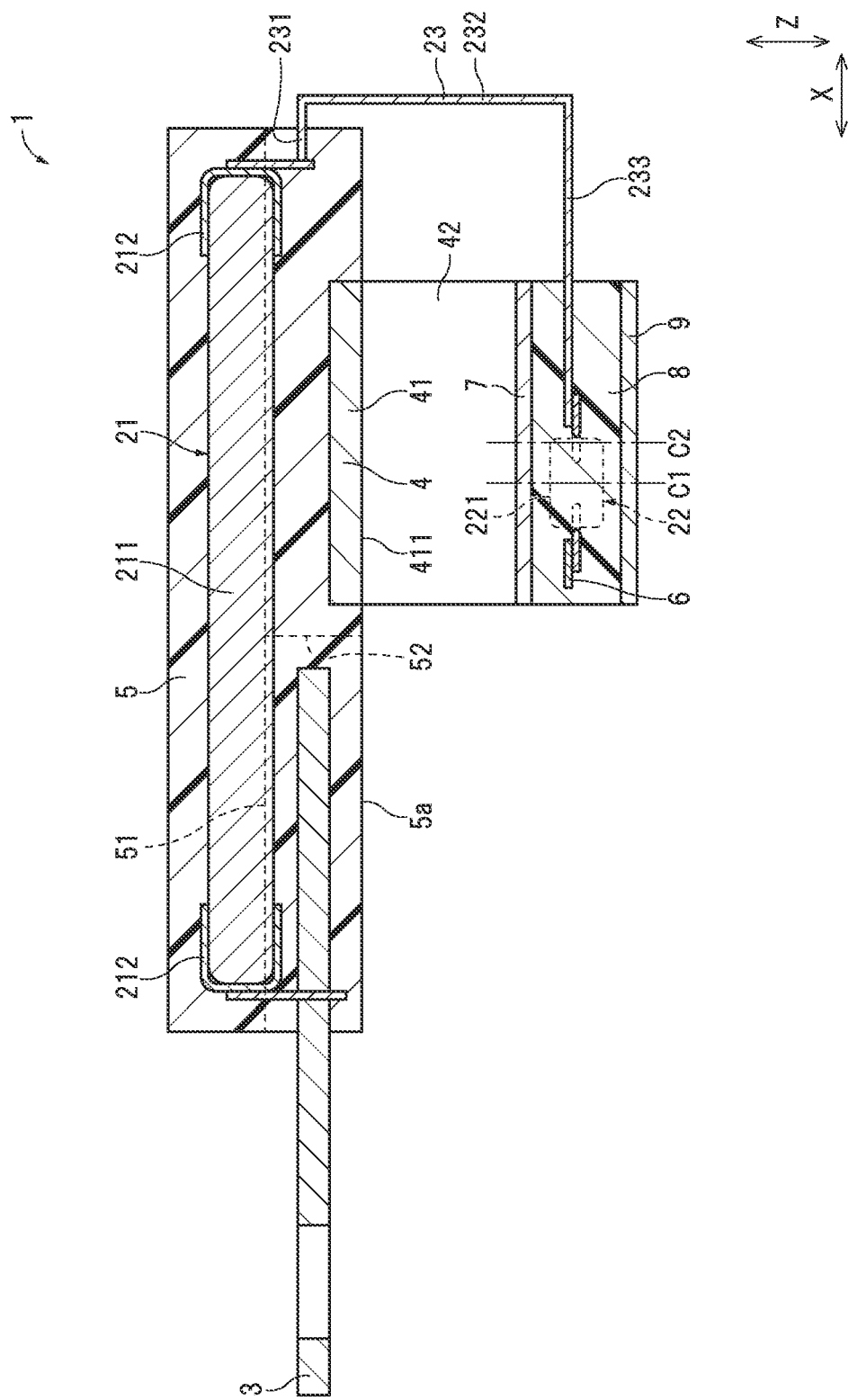
FIG. 11 is an arrowhead cross-sectional view along a XI-XI line of FIG. 10.

FIG. 9 is a perspective view of the surge suppression device 1. FIG. 10 is a front view of the surge suppression device 1. FIG. 11 is a cross-sectional view of the XI-XI line arrow in FIG. 10.

This embodiment is an embodiment in which the shape of the mold resin 5, the position of the fixing metal bracket 4, the position of the capacitor 22 with respect to the second mold resin 8, etc., have been modified with respect to the first embodiment.

The shape of the mold resin 5 has been devised to reduce the amount of resin used, to reduce size, and to reduce weight. The mold resin 5 has four first recesses 51 in which the surface opposite the second mold resin 8 in the Z-direction is recessed, and two second recesses 52 in which the surface on the side from which the terminal 3 protrudes in the X-direction is recessed. The four first recesses 51 are two first recesses 51 formed in the range between adjacent resistive elements 21 in the Y-direction and two first recesses 51 formed on the outer side in the Y-direction of the two resistive elements 21 located at both ends of the three resistive elements 21. The first recesses 51 are formed from one end of the mold resin 5 in the X-direction to the other end, and are open on both sides in the X-direction. As shown in FIG. 10, the formation range of the first recess 51 in the Z-direction overlaps the formation range of the resistive element 21 in the Z-direction. The second recess 52 is formed in the range between adjacent resistive elements 21 in the Y-direction. The second recess 52 is connected to the first recess 51. As shown in FIG. 11, the end face of the second recess 52 in the X-direction is located between the terminal 3 and the base 41 of the fixing metal bracket 4 in the X-direction.

The base 41 of the fixing metal bracket 4 faces the portion between the two cap electrodes 212 in the resistive element 211 in the Z-direction via the mold resin 5, while it does not face the two cap electrodes 212 in the Z-direction. The base 41 partly faces the central region of the resistive element 21 in the X-direction in the Z-direction. In the present embodiment, the base 41 partly faces the center of the resistive element 21 in the X-direction in the Z-direction. The bottom surface 411 of the base 41 is exposed from the mold resin 5 and is flush with the bottom surface 5a of the mold resin 5.

The capacitor 22 is eccentrically disposed in the X-direction with respect to the second mold resin 8. Here, one side in the X-direction, which is the direction in which the end of the capacitor 22—side (i.e., the third portion 233) in the connecting portion 23 extends, and the side where the capacitor 22 is positioned with respect to the third portion 233 is the tip side. As shown in FIG. 11, the center position C1 of the capacitor body 221 in the X-direction is located on the tip side of the second mold resin 8 than the center position C2 in the X-direction. The entire capacitor body 221 may be located on the tip side of the second mold resin 8 than the center position C2 in the X-direction of the second mold resin 8. Otherwise, the same as in the first embodiment.

Functions and Effects of the Third Embodiment

In this embodiment, the center position C1 of the capacitor body 221 in the X-direction is located at the tip side of the second mold resin 8 than the center position C2 in the X-direction. Hence, the length of the connecting portion 23 covered by the second mold resin 8 can be extended. A part of the heat of the resistive element 21 goes to the capacitor 22 through the connecting portion 23. In this embodiment, by increasing the length of the connecting portion 23 covered by the second mold resin 8, it is easier to diffuse the heat to the second mold resin 8. Therefore, the heat transfer of the resistive element 21 to the capacitor 22 is suppressed.

In addition, the recesses (i.e., the first recess 51 and the second recess 52) are formed in the mold resin 5 in the range between adjacent resistive elements 21 in the Y-direction. Therefore, the amount of mold resin 5 used can be reduced, the size can be made smaller, and the weight can be made lighter. In addition, since the surface of the mold resin 5 is formed unevenly by providing recesses in the mold resin 5, the surface area of the mold resin 5 can be ensured, and the heat dissipation from the mold resin 5 to the surrounding space can be improved. Other functions and effects are the same as those of the first embodiment.

Fourth Embodiment

Figure 12:
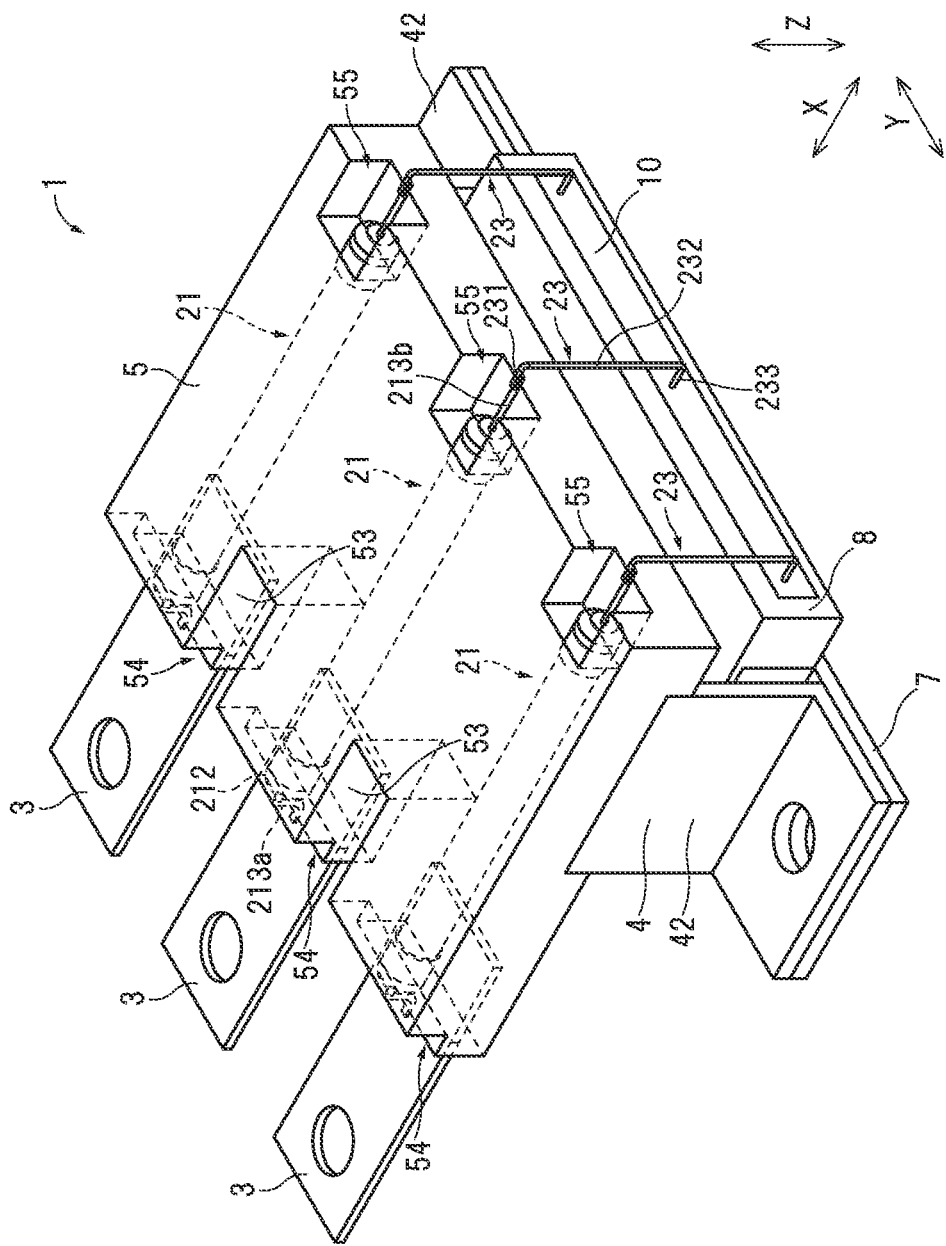
FIG. 12 is a perspective view of a surge suppression device in the fourth embodiment.
Figure 13:
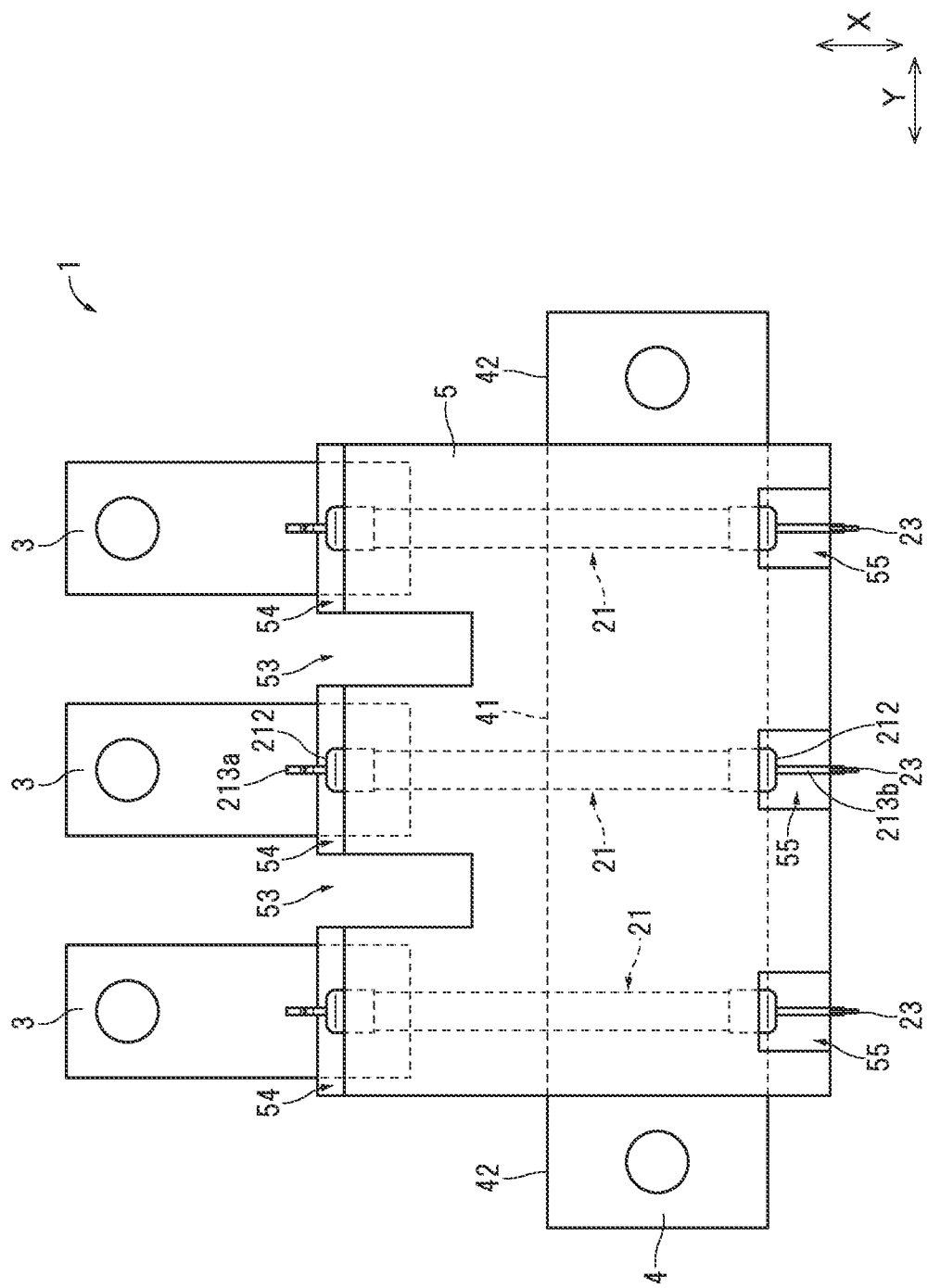
FIG. 13 is a plan view of the surge suppression device in the fourth embodiment.
Figure 14:
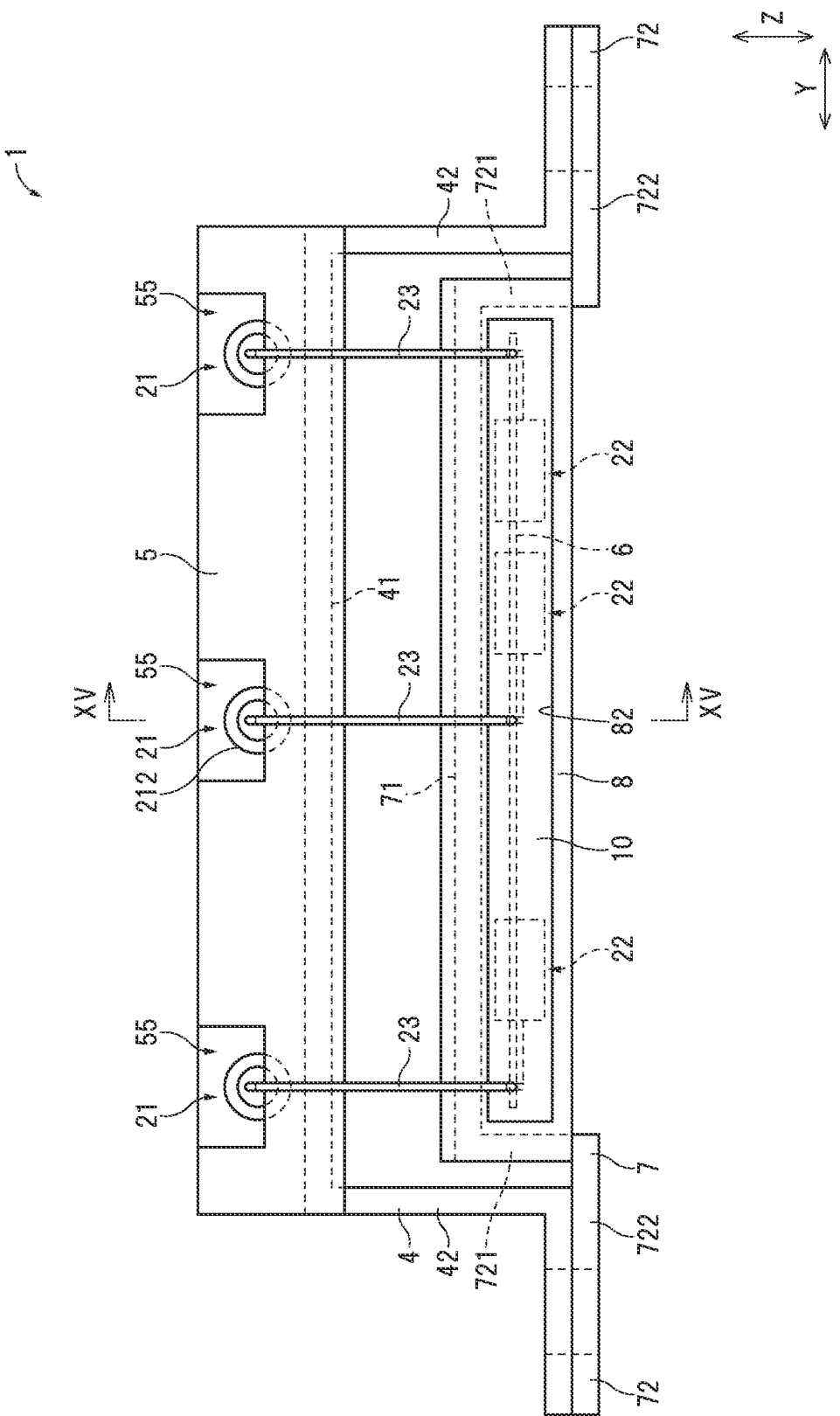
FIG. 14 is a front view of the surge suppression device in the fourth embodiment.
Figure 15:
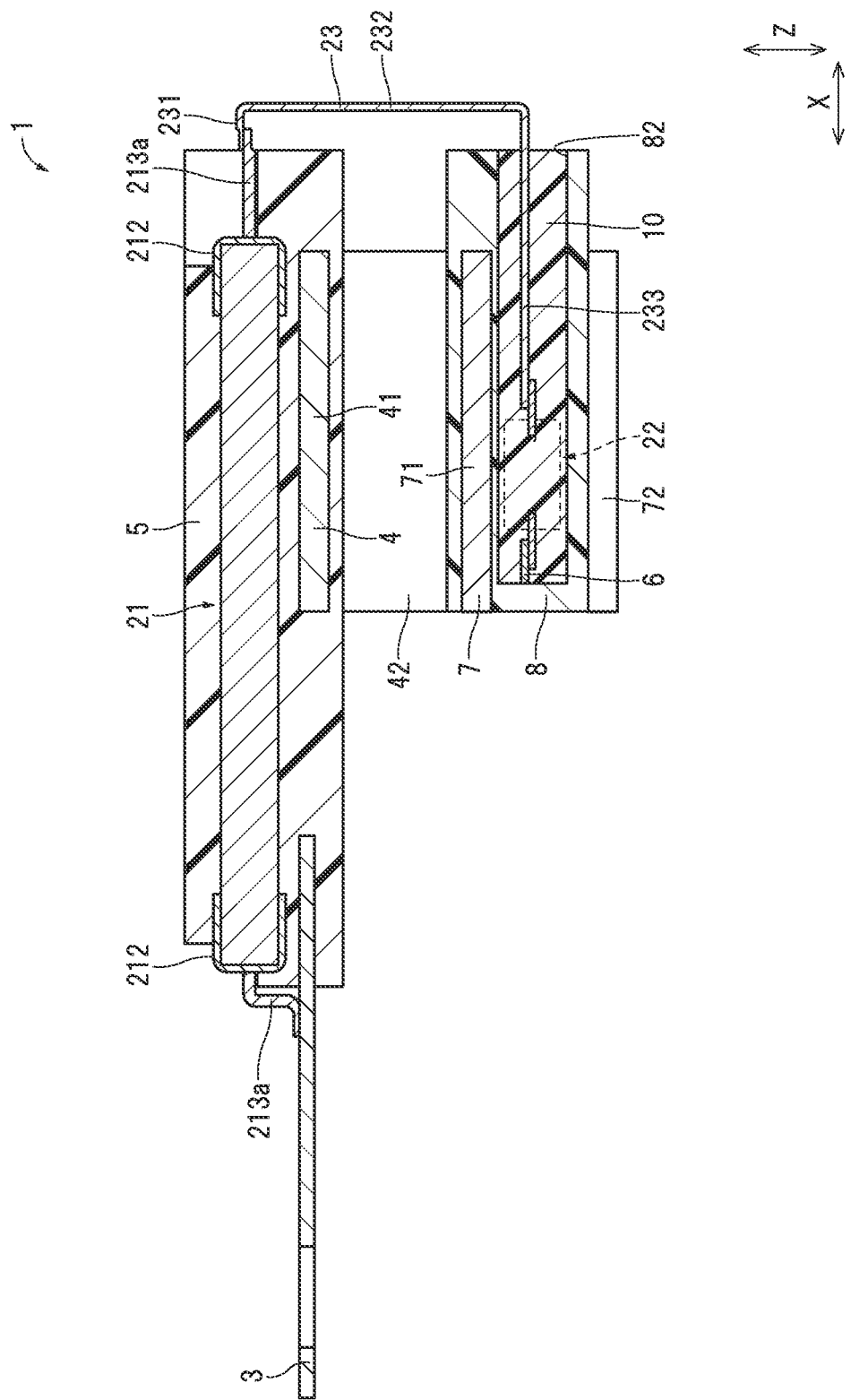
FIG. 15 is an arrowhead cross-sectional view along a XV-XV line of FIG. 14.

FIG. 12 is a perspective view of the surge suppression device 1 in this embodiment. FIG. 13 is a plan view of the surge suppression device 1. FIG. 14 is a front view of the surge suppression device 1. FIG. 15 is a cross-sectional view of the XV-XV line in FIG. 14.

This embodiment is an embodiment in which the shape of the mold resin 5, the shape of the connecting portion 23, and the sealing structure of the capacitor 22 are changed mainly with respect to the first embodiment.

As shown in FIGS. 12 and 13, a recess 53 is formed in the mold resin 5 in the range between adjacent resistive elements 21 in the Y-direction. The recess 53 is formed so that the surface of the terminal 3 side of the mold resin 5 in the X-direction is recessed in the X-direction in the entire Z-direction. The recess 53 serves to reduce the amount of resin used in the mold resin 5, reduce the weight of the mold resin 5, and ensure the creepage distance between adjacent resistive elements 21.

The mold resin 5 has a first exposed recess 54 for exposing the resistive element terminals 213a of the three resistive elements 21 connected to the three terminals 3 and a second exposed recess 55 for exposing the resistive element terminals 213b of the three resistive elements 21 connected to the three connecting portions 23.

In this embodiment, the first exposed recess 54 is formed at three locations in the mold resin 5 to expose each of the three resistive element terminals 213a. The first exposed recess 54 is formed at an end of the mold resin 5 on the terminal 3—side in the X-direction and on the opposite side of the second mold resin 8 in the Z-direction. In this embodiment, the entire resistive element terminal 213a and a portion of the cap electrode 212 connected to said resistive element terminal 213a are exposed from the first exposed recess 54. By exposing the resistive element terminal 213a from the mold resin 5, the injection pressure exerted during molding of the mold resin 5 on the junction portion of the resistive element terminal 213a and the terminal 3 can be suppressed and the connectivity between the resistive element terminal 213a and the terminal 3 can be ensured.

The second exposed recesses 55 are formed at three locations in the mold resin 5 so as to expose each of the three resistive element terminals 213b. The second exposed recess 55 is formed at the end of the mold resin 5 on the side of the connecting portion 23 in the X-direction and opposite the second mold resin 8 in the Z-direction. In this embodiment, the entire resistive element terminal 213b and a portion of the cap electrode 212 connected to the resistive element terminal 213b are exposed from the second exposed recess 55. By exposing the resistive element terminal 213b from the mold resin 5, the injection pressure during molding of the mold resin 5 can be prevented from acting on the junction portion between the resistive element terminal 213b and the connecting portion 23, and the connectivity between the resistive element terminal 213b and the connecting portion 23 can be ensured.

The second exposed recesses 55 are recesses closed on both sides in the Y-direction, and a portion of the mold resin 5 is present between adjacent second exposed recesses 55. This facilitates ensuring the insulation distance between adjacent resistive elements 21, and as a result of suppressing the decrease in the volume of the mold resin 5, the decrease in the heat dissipation of the resistive elements 21 through the mold resin 5 is suppressed. For example, it is also possible to adopt a configuration in which three resistive element terminals 213b are exposed in one wide second exposed recess. This configuration is particularly effective when it is desired to reduce the amount of mold resin 5 used, reduce weight, etc.

The pair of resistive element terminals 213a, 213b of the resistive element 21 comprise conductors of circular cross portion. In particular, when the pair of resistive terminals 213a, 213b of the resistive element 21 are made of conductive wires, if the resistive terminals 213a, 213b are embedded in the mold resin 5, unlike the present embodiment, there is a concern that injection pressure acts on the resistive terminals 213a, 213b during molding of the mold resin 5 and the load on the resistive terminals 213a, 213b In this case, there is a concern that the load on the resistive element terminals 213a, 213b may increase. Therefore, in this embodiment, the resistive element terminals 213a, 213b are exposed from the first exposed recess 54 and the second exposed recess 55.

The connecting portion 23 connecting the resistive element 21 and the capacitor 22 comprises a conductor with a circular cross portion. By configuring the connecting portion 23 with a conductor, the cross-sectional area of the conductor constituting the connecting portion 23 can be made smaller than the cross-sectional area of the terminal 3, and the heat transfer from the resistive element 21 to the capacitor 22 via the connecting portion 23 is suppressed. In this embodiment, the cross-sectional area of the conductor constituting the connecting portion 23 is smaller than the cross-sectional area of the terminal 3 and the resistive element terminals 213a, 213b, respectively. The connecting portion 23 may be a single wire or a stranded wire, and the surface of the connecting portion 23 may have an insulating coating.

As shown in FIGS. 12 and 15, the connecting portion 23 is formed by bending a conductor and has a first portion 231, a second portion 232, and a third portion 233. The first portion 231 is connected to the resistive element terminal 213b of the resistive element 21 and extends in the X-direction. The second portion 232 extends in the Z-direction from the opposite end of the resistive element terminal 213b of the first portion 231. The third portion 233 extends from the end of the second portion 232 opposite the first portion 231 to the same side of the first portion 231 in the X-direction and is connected to the capacitor 22.

As shown in FIGS. 14 and 15, the encapsulation structure of the capacitor 22 has a box-shaped second mold resin 8 that molds the second fixing metal bracket 7 and has an opening 82, and a potting resin 10 that encapsulates the capacitor 22 within the second mold resin 8. In this embodiment, the potting resin 10 is an example of a capacitor embedded resin that buries the capacitor 22.

The second mold resin 8 is formed in a rectangular box shape having an opening 82 on the opposite side of the terminal 3 in the X-direction, and buries the second base 71 and the second longitudinal extending portion 721 of the second fixing metal bracket 7. The three capacitors 22 and the interconnecting portions 6 are arranged in the second mold resin 8, which are sealed with potting resin 10.

The potting resin 10 comprises, for example, a thermosetting resin. The potting resin 10 should be composed of a resin having high thermal conductivity from the viewpoint of improving the heat dissipation of the capacitor 22. For example, the potting resin 10 comprises a base resin having electrical insulation properties and a filler having a higher thermal conductivity than the base resin. In this embodiment, the flat plate portion (see reference character 9 in FIGS. 2 to 4) in the first embodiment is not arranged, but may be arranged.

Figure 16:
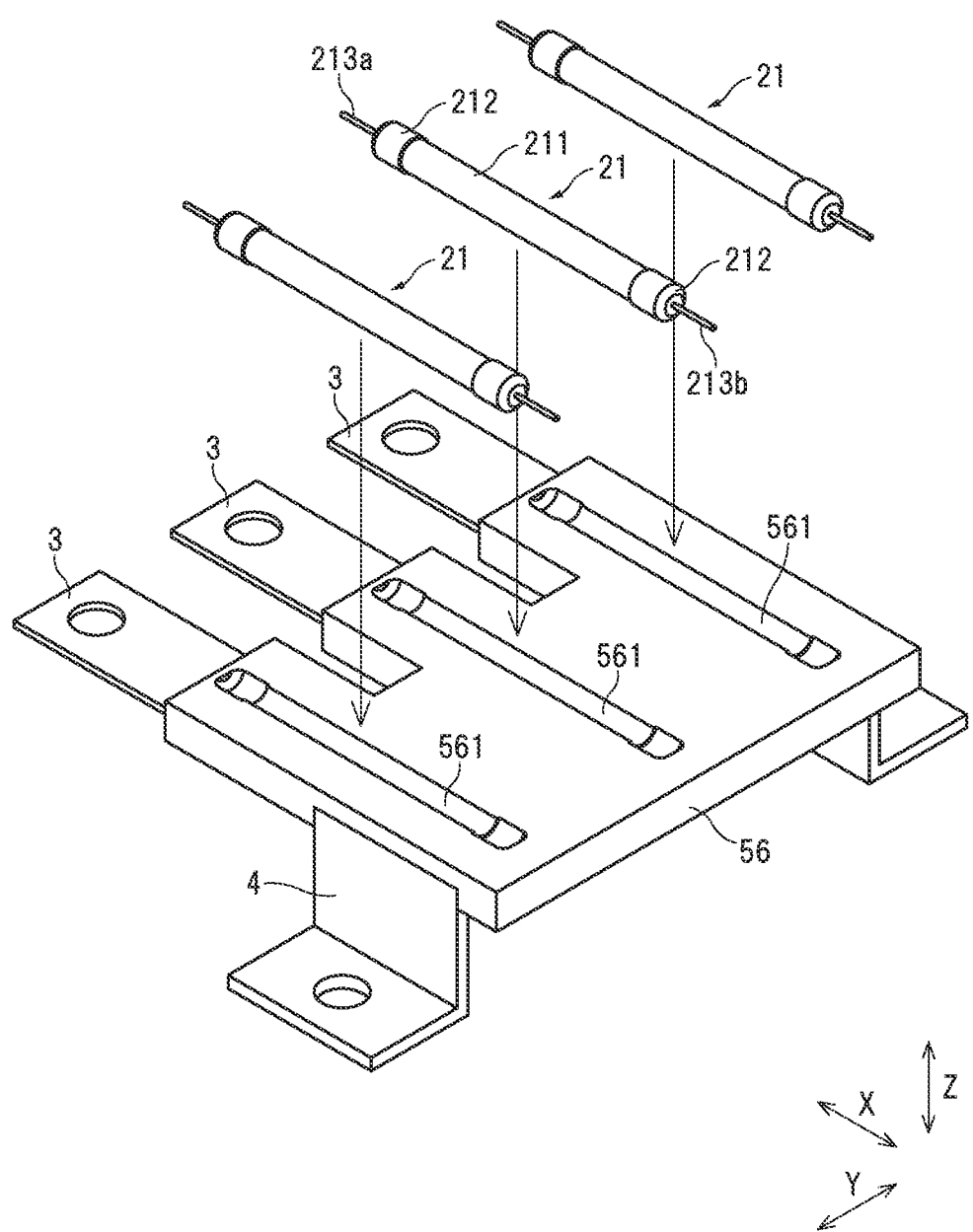
FIG. 16 is a perspective view of the arrangement of three resistive elements in the primary molding unit in the fourth embodiment.
Figure 17:
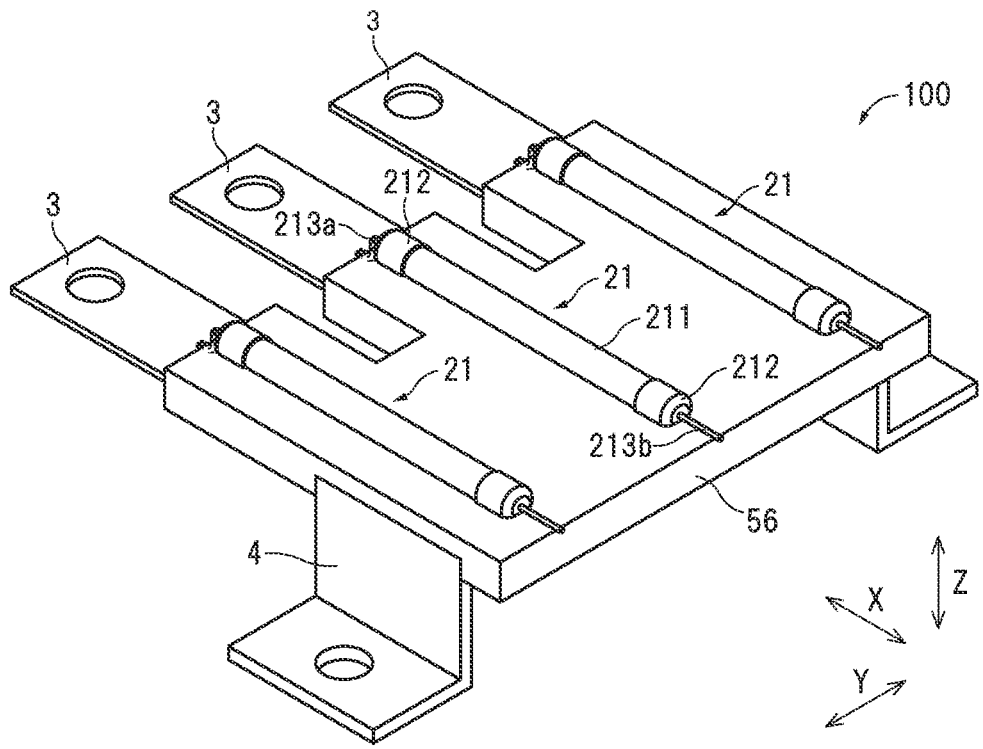
FIG. 17 is a perspective view showing the installation of three resistive elements in the primary molding unit in the fourth embodiment.
Figure 18:
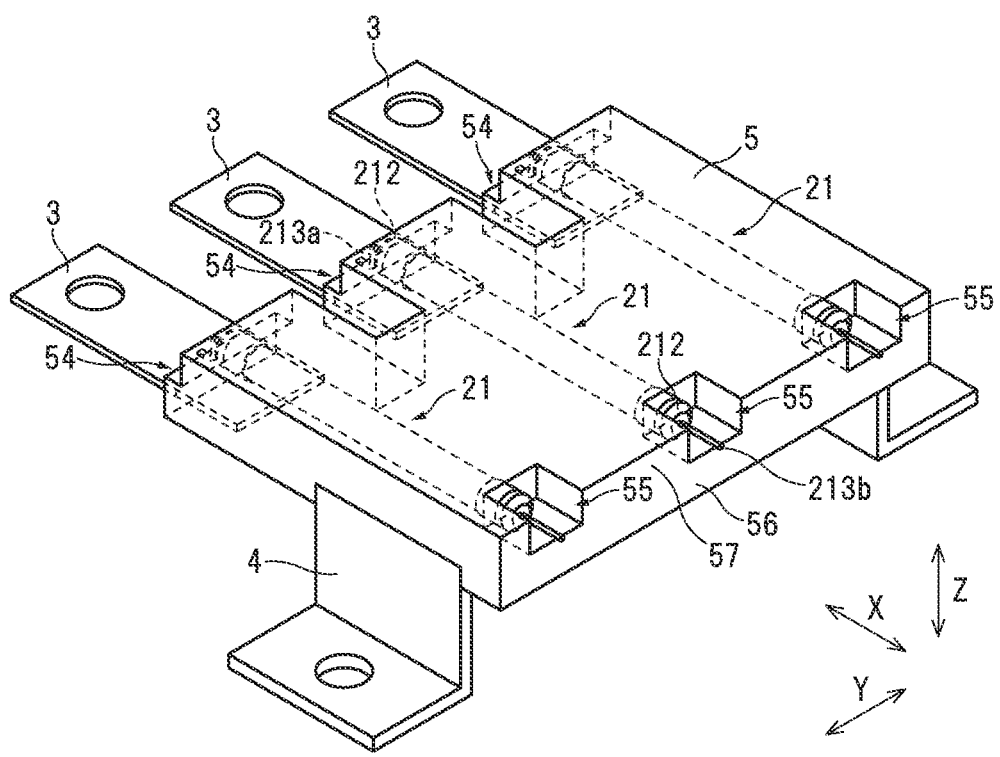
FIG. 18 is a perspective view showing the completed state of the mold resin in the fourth embodiment.

Next, an example of a method of molding the mold resin 5 so as to expose the pair of resistive element terminals 213a, 213b will be described using FIGS. 16 to 18. FIG. 16 is a perspective view showing the placement of the three resistive elements 21 in the primary molding unit 100. FIG. 17 is a perspective view of the three resistive elements 21 in the primary molding unit 100. FIG. 18 is a perspective view showing the completed state of the mold resin 5.

As will be described in detail below, the mold resin 5 is composed of a primary molding part 56 that molds the fixing metal bracket 4 and the three terminals 3, and a secondary molding part 57 that molds the integrated fixing metal bracket 4, the three terminals, the primary molding part 56, and the three resistive elements 21. In other words, the mold resin 5 of this embodiment is formed through a multi-step resin molding process; the primary molding part 56 and the secondary molding part 57 may be made of the same resin or of different resins.

In molding the mold resin 5, a primary molding process to form the primary molding part 56, a resistive element placement process to place the three resistive elements 21 in the primary molding part 56, and a secondary molding process to form the secondary molding part 57 are performed in this order.

In the primary molding process, the three terminals 3 and the fixing metal bracket 4 are placed in a mold, and resin is injected into the mold and cured to form the primary molding part 56, as shown in FIG. 16. At this time, the shape of the mold is designed so that three placement recesses 561 are formed on the surface of the primary molding part 56 after molding to enable placement of the three resistive elements 21. In this embodiment, the placement recesses 561 are formed so that a portion of each of the resistive element 211 and the pair of cap electrodes 212 can be inserted, and the pair of resistive terminals 213a, 213b are arranged outside the placement recesses 561 when the resistive elements 21 are placed in the placement recesses 561.

After the primary molding process, the resistive element placement process is performed as shown in FIGS. 16 and 17. In this embodiment, during the resistive element placement process, the joining of the resistive element terminal 213a to the terminal 3 is performed. This joining work may be performed after the entire mold resin 5 is completed.

Next, a secondary molding process is carried out: in the secondary molding process, the primary molding unit 100 comprising the primary molding part 56, the three resistive elements 21, and the fixing metal bracket 4 is placed in the mold, and resin is injected into said mold to cure, forming the secondary molding part 57, as shown in FIG. 18. At this time, the entire pair of resistive element terminals 213a and 213b of the resistive element 21 is placed outside the cavity of the mold, so that the pair of resistive element terminals 213a and 213b are exposed outside the mold resin 5. As a result of the above, the mold resin 5 is molded with the primary molding part 56 and the secondary molding part 57 integrated together.

Functions and Effects of the Fourth Embodiment

In this embodiment, the second mold resin 8 is formed in a box shape having an opening 82. The surge suppression device 1 has a potting resin 10 that encapsulates the capacitor 22 in the second mold resin 8. During the formation of the potting resin 10, i.e., during potting, it is relatively difficult for pressure to be generated in the resin, thus preventing a large pressure from acting on the capacitor 22 when the capacitor 22 is encapsulated. This prevents, for example, a load from being applied to the junction between the capacitor 22 and the components connected thereto (e.g., the connecting portion 23 and the interconnecting portion 6), thereby reducing the connectivity of the capacitor 22 and the components connected to the capacitor 22.

The entirety of the pair of resistive element terminals 213a, 213b is exposed from the mold resin 5. Therefore, injection pressure during molding of the mold resin 5 does not act on the resistive element terminals 213a, 213b, and the load on the junction between the resistive element terminals 213a, 213b and the components connected thereto (e.g., the terminals 3 and the connecting portion 23) resulting in a degradation of their connectivity can be suppressed.

In addition, the connecting portion 23 comprises a conductor. Hence, the heat transfer from the resistive element 21 to the capacitor 22 via the connecting portion 23 is suppressed. Other functions and effects are similar to those of the first embodiment.

SUMMARY OF THE EMBODIMENTS

Next, the technical concepts that can be grasped from the above-described embodiments are described with the help of the reference characters, etc. in the embodiments. However, each reference character, etc. in the following description is not limited to the members, etc. specifically shown in the embodiment as the components in the scope of claims.

According to the first feature, a surge suppression device includes a resistive element 21, a capacitor 22 electrically connected to the resistive element 21, a terminal 3 electrically connected to an opposite side of the resistive element 21 to a side connected to the capacitor 22, a fixing metal bracket 4 to be fixed to a fixing target 111, and a mold resin 5 that molds the resistive element 21, the terminal 3, and the fixing metal bracket 4, wherein the capacitor 22 is located away from the mold resin 5.

According to the second feature, in the surge suppression device 1 as described in the first feature, the fixing metal bracket 4 faces the resistive element 21 through the mold resin 5.

According to the third feature, in the surge suppression device 1 as described in the first or second feature, the terminal 3 faces the resistive element 21 through the mold resin 5.

According to the fourth feature, in the surge suppression device 1 according to any one of the first to third features, a connecting portion 23 connecting the resistive element 21 and the capacitor 22 is molded by the mold resin 5, and the connecting portion 23 is facing the fixing metal bracket 4 through the mold resin 5.

According to the fifth feature, in the surge suppression device 1 according to the fourth feature, the cross-sectional area of the connecting portion 23 is smaller than the cross-sectional area of the terminal 3.

According to the sixth feature, the surge suppression device 1 according to any one of the first to fifth features, further includes a capacitor embedded resin 8, 10 in which the capacitor 22 is embedded, wherein the capacitor embedded resin 8, 10 is located away from the mold resin 5.

According to the seventh feature, in the surge suppression device 1 according to the sixth feature, the fixing metal bracket 4 includes a base 41 extending in one direction Y, and two extending portions 42 extending on the same side from both ends of the base 41, wherein the base 41 is molded by the mold resin 5, and wherein the capacitor embedded resin 8, 10 is disposed between the two extending portions 42.

According to the eighth feature, in the surge suppression device 1 according to the sixth or seventh feature, the capacitor 22 includes a capacitor body 221, and a capacitor terminal 222 protruding from the capacitor body 221, and wherein when a direction of extending an end 233 on the capacitor 22 of the connecting portion 23 connecting the resistive element 21 and the capacitor 22 is the extending direction X, and one side in the extending direction X where the capacitor 22 is located relative to the end 233 is a tip side, a center position C1 of the capacitor body 221 in the extending direction X is located on the tip side of the capacitor body 221 than the center position C2 of the capacitor embedded resin 8, 10 in the extending direction X.

According to the ninth feature, the surge suppression device 1 according to any one of the sixth to eighth features, further includes a second fixing metal bracket 7 to be fixed to a fixing target 111, wherein the capacitor embedded resin 8, 10 is a second mold resin 8 that molds the connecting portion 23 connecting the resistive element 21 and the capacitor 22, and the second fixing metal bracket 7.

According to the tenth feature, the surge suppression device 1 according to any one of the sixth to eighth features, further includes a second fixing metal bracket 7 to be fixed to the fixing target 111, and a second mold resin 8 to mold the second fixing metal bracket 7, wherein the second mold resin 8 is formed in a box shape having an opening 82, and wherein the capacitor embedded resin 8, 10 is a potting resin 10 that encapsulates the capacitor 22 within the second mold resin 8.

According to the eleventh feature, the surge suppression device 1 according to any one of the first to tenth features, includes a plurality of series circuits 2 in which the resistive elements 21 and the capacitors 22 are connected in series, wherein the mold resin 5 molds a plurality of the resistive elements 21.

According to the twelfth feature, in the surge suppression device 1 according to the eleventh feature, the plurality of resistive elements 21 are arranged in parallel, and wherein a recess 51, 52, 53 is formed in the mold resin 5 in the range between adjacent resistive elements 21 in an alignment direction of the plurality of resistive elements 21.

According to the thirteenth feature, in the surge suppression device 1 as described in any one of the first to twelfth features, the mold resin 5 includes a base resin 501 and a filler 502 having a higher thermal conductivity than the base resin 501.

According to the fourteenth feature, in the surge suppression device 1 according to the thirteenth feature, the thermal conductivity of the mold resin 5 is 3 W/m·K or more and 10 W/m·K or less.

According to the fifteenth feature, in the surge suppression device 1 according to any one of the first to fourteenth features, the resistive element 21 includes a pair of resistive element terminals 213a, 213b, and an entirety of the pair of resistive element terminals 213a, 213b is exposed from the mold resin 5.

According to the sixteenth feature, in the surge suppression device 1 according to any one of the first to fifteenth features, the connecting portion 23 connecting the resistive element 21 and the capacitor 22 comprises a conductor.

Additional Notes

The above description of the embodiments of the invention is not intended to limit the invention according to the claims. It should also be noted that not all of the combinations of features described in the embodiments are essential for the invention to solve the problems of the invention. In addition, the invention can be implemented with appropriate modifications to the extent that it does not depart from the intent of the invention.

For example, in each of the foregoing embodiments, the fixing metal bracket is embedded in the mold resin, but it is not limited thereto, and it is sufficient if a portion of the surface is adhered to the mold resin. For example, the second fixing metal bracket is not in the form of embedded in the second mold resin, but the fixing metal bracket and the mold resin may also be configured as the second fixing metal bracket and the second mold resin. Conversely, the second fixing metal bracket may be configured to be embedded in the second mold resin.

In each of the foregoing embodiments, an example is shown in which the terminal portion is a straight plate, but the shape of the terminal portion can be changed as needed depending on the location of the connecting portion target of the terminal. For example, the terminal part may be made of a metal plate bent into an L-shape, etc.

The invention claimed is:

1. A surge suppression device, comprising:
a resistive element;
a capacitor electrically connected to the resistive element;
a terminal electrically connected to an opposite side of the resistive element to a side connected to the capacitor;
a fixing metal bracket to be fixed to a fixing target; and
a mold resin to mold the resistive element, the terminal, and the fixing metal bracket, wherein the capacitor is located away from the mold resin,
wherein, in a plan view of the surge suppression device, the mold resin overlaps the capacitor while the resistive element is shifted from the capacitor so as not to overlap.

2. The surge suppression device according to claim 1, wherein the fixing metal bracket faces the resistive element through the mold resin.

3. The surge suppression device according to claim 1, wherein the terminal faces the resistive element through the mold resin.

4. The surge suppression device according to claim 1, wherein a connecting portion connecting the resistive element and the capacitor is molded by the mold resin, and wherein the connecting portion is facing the fixing metal bracket through the mold resin.

5. The surge suppression device according to claim 4, wherein a cross-sectional area of the connecting portion is smaller than a cross-sectional area of the terminal.

6. The surge suppression device according to claim 1, further comprising:
a capacitor embedded resin in which the capacitor is embedded, wherein the capacitor embedded resin is located away from the mold resin.

7. The surge suppression device according to claim 6, wherein the fixing metal bracket includes a base extending in one direction, and two extending portions extending on a same side from both ends of the base, wherein the base is molded by the mold resin, and wherein the capacitor embedded resin is disposed between the two extending portions.

8. The surge suppression device according to claim 6, wherein the capacitor includes a capacitor body, and a capacitor terminal protruding from the capacitor body, and
wherein when a direction of extending an end on the capacitor of a connecting portion connecting the resistive element and the capacitor is an extending direction and one side in the extending direction where the capacitor is located relative to the end is a tip side, a center position of the capacitor body in the extending direction is located on the tip side than the center position of the capacitor embedded resin in the extending direction.

9. The surge suppression device according to claim 6, further comprising:
a second fixing metal bracket to be fixed to a fixing target,
wherein the capacitor embedded resin is a second mold resin that molds the connecting portion connecting the resistive element and the capacitor, the capacitor, and the second fixing metal bracket.

10. The surge suppression device of claim 6, further comprising:
a second fixing metal bracket to be fixed to a fixing target; and a second mold resin that molds the second fixing metal bracket,
wherein the second mold resin is formed in a box shape having an opening, and wherein the capacitor embedded resin is a potting resin that encapsulates the capacitor within the second mold resin.

11. The surge suppression device of claim 1, further comprising:
a plurality of series circuits each comprising the resistive element and the capacitor connected in series,
wherein the mold resin molds a plurality of the resistive elements.

12. The surge suppression device according to claim 11, wherein the plurality of resistive elements are arranged in parallel, and
wherein the mold resin comprises a recess formed in a range between adjacent resistive elements in an alignment direction of the plurality of resistive elements.

13. The surge suppression device as recited in claim 1, wherein the mold resin includes a base resin and a filler comprising a higher thermal conductivity than the base resin.

14. The surge suppression device according to claim 13, wherein a thermal conductivity of the mold resin is 3 W/(m·K) or more and 10 W/(m·K) or less.

15. The surge suppression device according to claim 1, wherein the resistive element includes a pair of resistive element terminals, and wherein an entirety of the pair of resistive element terminals is exposed from the mold resin.

16. The surge suppression device according to claim 1, wherein a connecting portion connecting the resistive element to the capacitor comprises a conductor.

17. The surge suppression device, according to claim 1, wherein the resistive element comprises three resistive elements and the capacitor comprises three capacitors, wherein the resistive element is shifted from the capacitor in the plan view for all three sets of the resistive element and the capacitor connected to the resistive element.

18. The surge suppression device, according to claim 4, wherein the connecting portion comprises a metallic material having lower thermal conductivity than the terminal.

19. The surge suppression device, according to claim 4, wherein the terminal is made of pure copper, and the connecting portion is made of phosphor bronze.

* * * * *